United States Patent [19]
Tokunaga

[11] Patent Number: 6,075,947
[45] Date of Patent: Jun. 13, 2000

[54] CAMERA SYSTEM AND FLASH PHOTOGRAPHY SYSTEM

[75] Inventor: Tatsuyuki Tokunaga, Yono, Japan

[73] Assignee: Canon Kabushiki Kaisha, Tokyo, Japan

[21] Appl. No.: 09/280,621

[22] Filed: Mar. 29, 1999

[30] Foreign Application Priority Data

Apr. 1, 1998 [JP] Japan .................................. 10-088927

[51] Int. Cl.[7] .................................................. G03B 15/05
[52] U.S. Cl. ........................... 396/157; 396/159; 396/182
[58] Field of Search ........................... 396/157, 159–163, 396/182

[56] References Cited

U.S. PATENT DOCUMENTS

| Re. 35,877 | 8/1998 | Takagi | ...................................... 396/157 |
| 4,457,602 | 7/1984 | Mizokami | ........................... 396/182 X |

*Primary Examiner*—W. B. Perkey
*Attorney, Agent, or Firm*—Robin, Blecker & Daley

[57] ABSTRACT

A camera system includes a plurality of flash devices for performing flash light emission toward an object during an exposure, a preliminary light emission control circuit for causing the plurality of flash devices to sequentially make preliminary light emission toward the object prior to the flash light emission to be performed by the plurality of flash devices during the exposure, a compression-type light measuring sensor for compressing a photoelectric current obtained by converting light from the object and for outputting the compressed photoelectric current as a voltage, and a light emission amount control circuit for controlling amounts of light emission of the plurality of flash devices during the exposure on the basis of light measurement outputs during the preliminary light emission obtained by the compression-type light measuring sensor by measuring reflected light from the object caused by the preliminary light emission control circuit.

20 Claims, 14 Drawing Sheets

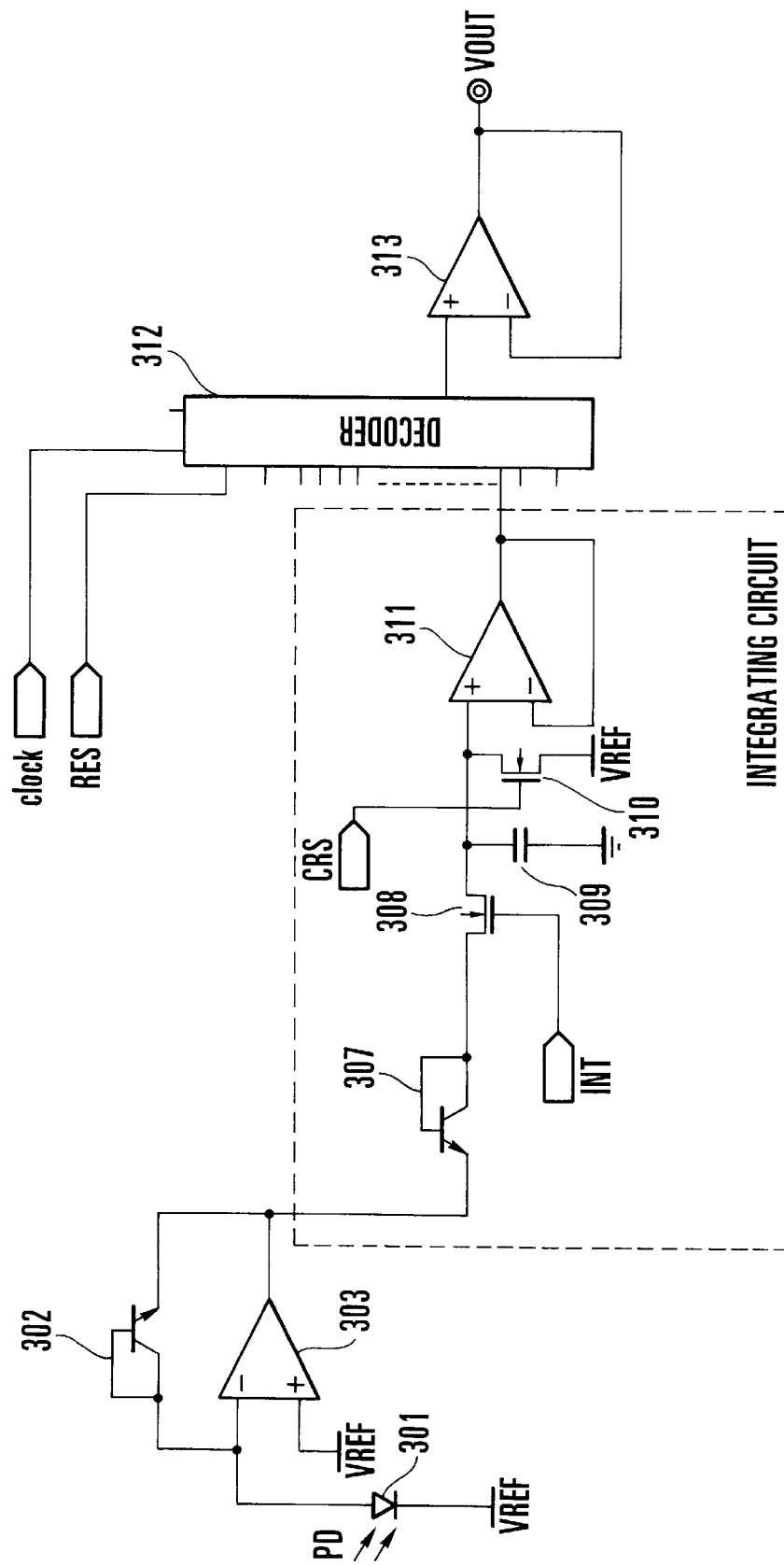
F I G. 4

F I G. 6
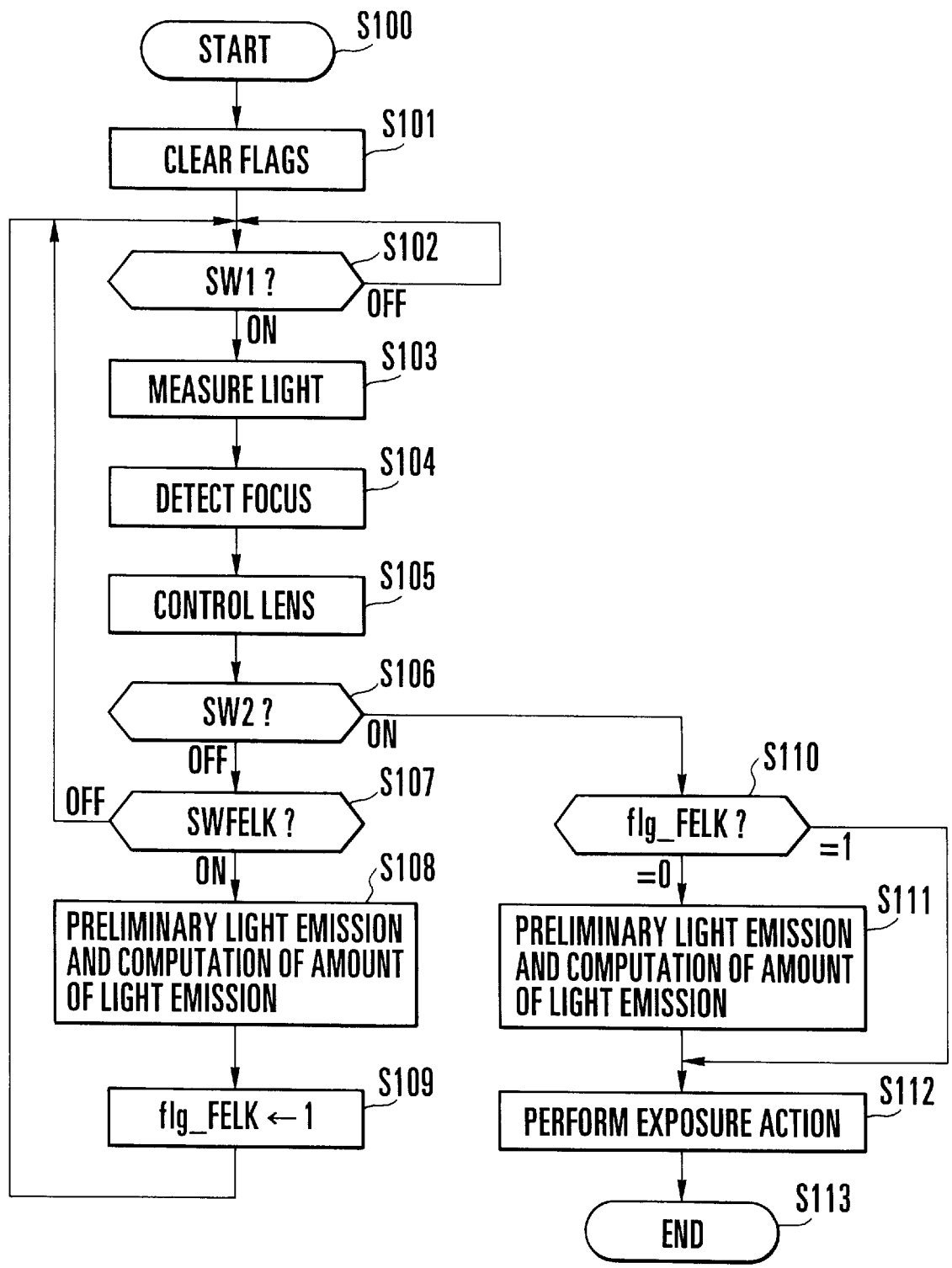

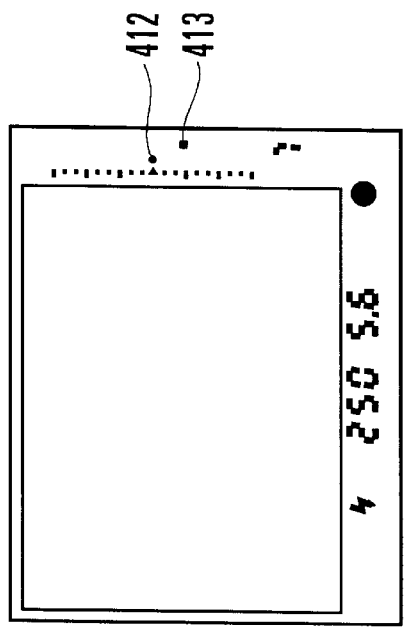
FIG.12(B)
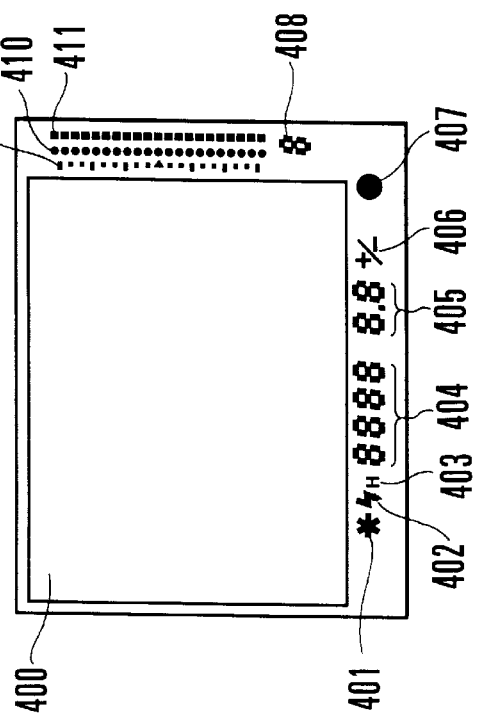
FIG.12(A)
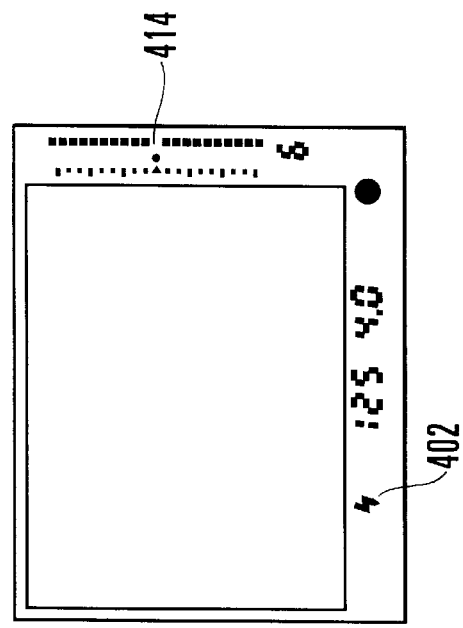
FIG.12(D)
FIG.12(C)

| RATIO | CORRECTION AMOUNT (f) OF FIRST FLASH DEVICE | CORRECTION AMOUNT (f) OF SECOND FLASH DEVICE |
|---|---|---|
| 8:1 | -0.2 | -3.2 |
| 4:1 | -0.3 | -2.3 |
| 2:1 | -0.6 | -1.6 |
| 1:1 | -1.0 | -1.0 |
| 1:2 | -1.6 | -0.6 |
| 1:4 | -2.3 | -0.3 |
| 8:1 | -3.2 | -0.2 |

CAMERA SYSTEM AND FLASH PHOTOGRAPHY SYSTEM

BACKGROUND OF THE INVENTION

1. Field of the Invention

The present invention relates to a camera system which performs such an exposure action as to emit light toward an object of shooting from a flash device employed as flash light emitting means and adjusts the amount of light emission to automatically obtain an apposite exposure, and more particularly, relates to a camera system and a flash photography system each of which is capable of a multi-flash-device photography in which two or more flash light emitting means are used for photography.

2. Description of Related Art

It has heretofore been known to simultaneously control and cause two or more flash devices to illuminate one object of shooting, such as a person, from different directions for the purpose of stereoscopically depicting the object or for erasing some shadow produced by the light of one of the light emitting parts with that of another. This method is called a multi-flash-device photography.

In the multi-flash-device photography, the result of photographing varies according to the ratio of the light amount of each individual flash device to the total light amount of the plurality of flash devices. It is, therefore, important to have the light amount of each of these flash devices controlled as desired by the user of the camera system. In that respect, the multi-flash-device photography is performed in varied patterns. For example, one of the flash devices is used for illuminating only the background of a scene so as to erase a shadow on the background or to strengthen the color of the background.

According to a known technique, a total amount of light to be emitted by a plurality of flash devices is controlled to an apposite amount in a predetermined ratio of light emission amounts, for example, in the following manner. Two flash devices are simultaneously caused to begin to emit light to obtain reflected light from the object of shooting. The reflected light from the object is measured and integrated. One of the two flash devices is stopped from emitting light when the reflected light reaches a first predetermined amount and the other flash device is stopped from emitting light when the reflected light reaches a second predetermined amount.

A camera system disclosed in DE 3346757 (Bron Elektronik) is arranged to obtain an apposite amount of exposure by making preliminary light emission from a plurality of flash devices in a preset light amount ratio in the multi-flash-device photography, measuring reflected light thus obtained from an object of shooting, and using the obtained result of light measurement for making main light emission.

According to another method disclosed in Japanese Laid-Open Patent Application No. HEI 6-180472, two flash devices are respectively caused to make preliminary light emission, the amounts of reflected light from an object of shooting resulting from the preliminary light emission by the two flash devices are respectively measured, the amounts of main light emission to be made by the two flash devices are computed separately from each other, and the main light emission for exposure is controlled on the basis of the results of the computing operations.

However, the camera system disclosed in the above Japanese Laid-Open Patent Application No. HEI 6-180472 is arranged to measure the amount of reflected light of the object resulting from the preliminary light emission by using a sensor which is arranged to simply integrate a photoelectric current and convert it into a voltage. Therefore, the dynamic range of the sensor is narrow. As a result, when a predetermined value has not been able to be obtained by the preliminary light emission due to the narrow dynamic range, that arrangement necessitates the preliminary light emission to be made again by varying the number of pulses for preliminary light emission to vary a total light amount of the preliminary light emission.

BRIEF SUMMARY OF THE INVENTION

It is a principal object of the invention to provide a camera system which is arranged to permit taking a high quality picture in the multi-flash-device photography, by a simple operation, in such a way as to have the picture taken finely reflect the intention of the operator of the camera system.

To attain the above object, in accordance with an aspect of the invention, there is provided a camera system, which comprises a plurality of flash light emission means for performing flash light emission toward an object during an exposure, preliminary light emission control means for causing the plurality of flash light emission means to sequentially make preliminary light emission toward the object prior to the flash light emission to be performed by the plurality of flash light emission means during the exposure, compression-type light measuring means for compressing a photoelectric current obtained by converting light from the object and for outputting the compressed photoelectric current as a voltage, and light emission amount control means for controlling amounts of light emission of the plurality of flash light emission means during the exposure on the basis of light measurement outputs during the preliminary light emission obtained by the compression-type light measuring means by measuring reflected light from the object caused by the preliminary light emission control means.

In accordance with another aspect of the invention, there is provided a camera system, which comprises a plurality of flash light emission means for performing flash light emission toward an object during an exposure, preliminary light emission control means for causing the plurality of flash light emission means to sequentially make preliminary light emission toward the object prior to the flash light emission to be performed by the plurality of flash light emission means during the exposure, light measuring means for outputting a luminance value of each of a plurality of areas into which an image plane is divided, first light emission amount computing means for measuring, by the light measuring means, reflected light from the object caused by the preliminary light emission made by a first flash light emission means of the plurality of flash light emission means, and for computing, on the basis of the measured reflected light, an amount of light emission to be performed by the first flash light emission means during the exposure, second light emission amount computing means for measuring, by the light measuring means, reflected light from the object caused by the preliminary light emission made by a second flash light emission means of the plurality of flash light emission means, and for computing, on the basis of the measured reflected light, an amount of light emission to be performed by the second flash light emission means during the exposure, and deciding means for deciding a rate of contribution of each of the plurality of areas of the light measuring means to the computation by the first light emission amount computing means and a rate of contribution of each of the plurality of areas of the light measuring means to the computation by the second light emission amount computing means, the deciding means relating the rate of contribution of each of the plurality of areas to the computation by the second light emission amount computing means with the rate of contribution of each of the plurality of areas to the computation by the first light emission amount computing means.

In accordance with a further aspect of the invention, there is provided a camera system, which comprises first and second flash light emission means for performing flash light emission toward an object during an exposure, first and second preliminary light emission control means for respectively causing the first and second flash light emission means to sequentially make preliminary light emission toward the object prior to the flash light emission to be performed by the first and second flash light emission means during the exposure, light measuring means for outputting a luminance value of each of a plurality of areas into which an image plane is divided, first light emission amount computing means for measuring, by the light measuring means, reflected light from the object caused by the preliminary light emission made by the first flash light emission means, and for computing, on the basis of the measured reflected light, an amount of light emission to be performed by the first flash light emission means during the exposure, second light emission amount computing means for measuring, by the light measuring means, reflected light from the object caused by the preliminary light emission made by the second flash light emission means, and for computing, on the basis of the measured reflected light, an amount of light emission to be performed by the second flash light emission means during the exposure, and deciding means for deciding, among the plurality of areas of the light measuring means, an area which contributes the computation by the first light emission amount computing means and an area which contributes the computation by the second light emission amount computing means, the deciding means being capable of making the area which contributes the computation by the first light emission amount computing means different from the area which contributes the computation by the second light emission amount computing means.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 4 is a circuit diagram showing a light measuring circuit shown in FIG. 2.

FIG. 6 is a flow chart showing a main flow of operation of the flash-device/camera system according to the first embodiment of the invention.

FIGS. 12(A) to 12(D) show displays made within a viewfinder of the camera body shown in FIG. 1.

DETAILED DESCRIPTION OF THE INVENTION

Hereinafter, preferred embodiments of the invention will be described in detail with reference to the drawings.
(First Embodiment)

Figure 1:
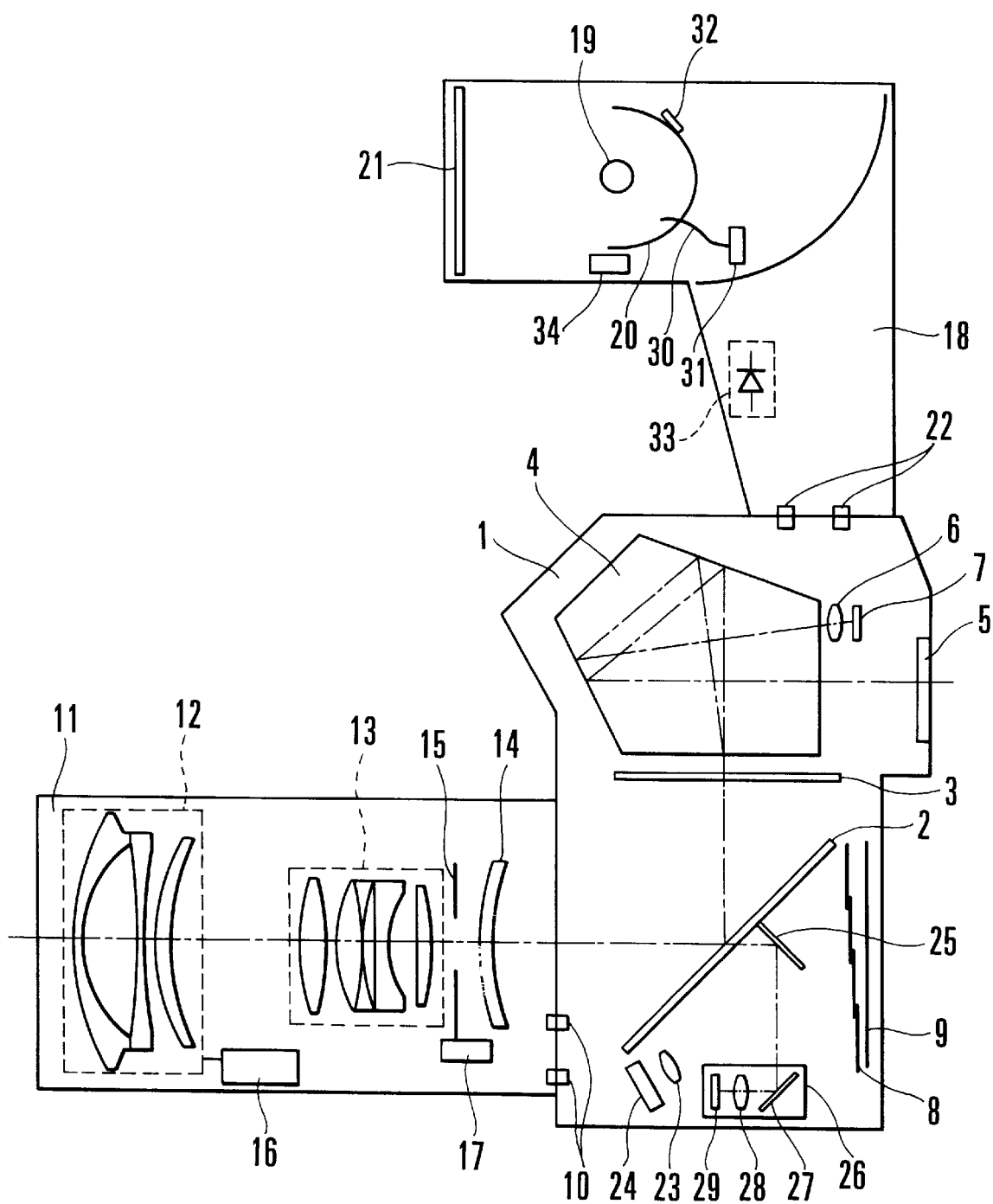
FIG. 1 is a transverse sectional view showing a flash-device/camera system according to a first embodiment of the invention.

FIG. 1 is a transverse sectional view mainly showing the optical arrangement of a flash-device/camera system applied to a single-lens reflex camera according to a first embodiment of the invention.

Referring to FIG. 1, a lens barrel 11 is mounted on a camera body 1. An external flash device 18 is mounted on the top of the camera body 1. In the case of the first embodiment, the flash-device/camera system is provided with at least one more flash device (not shown) having the same function as the flash device 18 for the multi-flash-device photography. However, since other flash devices are arranged in the same manner as the flash device 18, they are omitted from the following description.

Optical and mechanical parts, electric circuits, a film, etc., are contained in the camera body 1 for photo-taking actions. A main mirror 2 is arranged to be either in a position of obliquely set in a photo-taking optical path or in a position of being retracted from the optical path according to whether the camera is in an observing state or in a photo-taking state. Further, the main mirror 2 is a half mirror and arranged to allow about one half of a light flux from the object of shooting to pass therethrough toward a focus detecting optical system even when it is in the obliquely set position. A focusing screen 3 is set on a prescribed image forming plane of a photo-taking lens (photo-taking lens groups 12, 13 and 14). A pentagonal prism 4 is arranged to bend an optical path for a viewfinder 5. The viewfinder 5 is arranged to enable the operator of the camera system to view a photo-taking image plane from an observation window through the focusing screen 3. An image forming lens 6 and a multi-divided light measuring sensor 7 are provided for measuring the luminance of an object of shooting appearing within an observing image plane. The image forming lens 6 is arranged to make the focusing screen 3 and the multi-divided light measuring sensor 7 conjugate to each other through a reflection optical path formed inside of the pentagonal prism 4.

Figure 5:
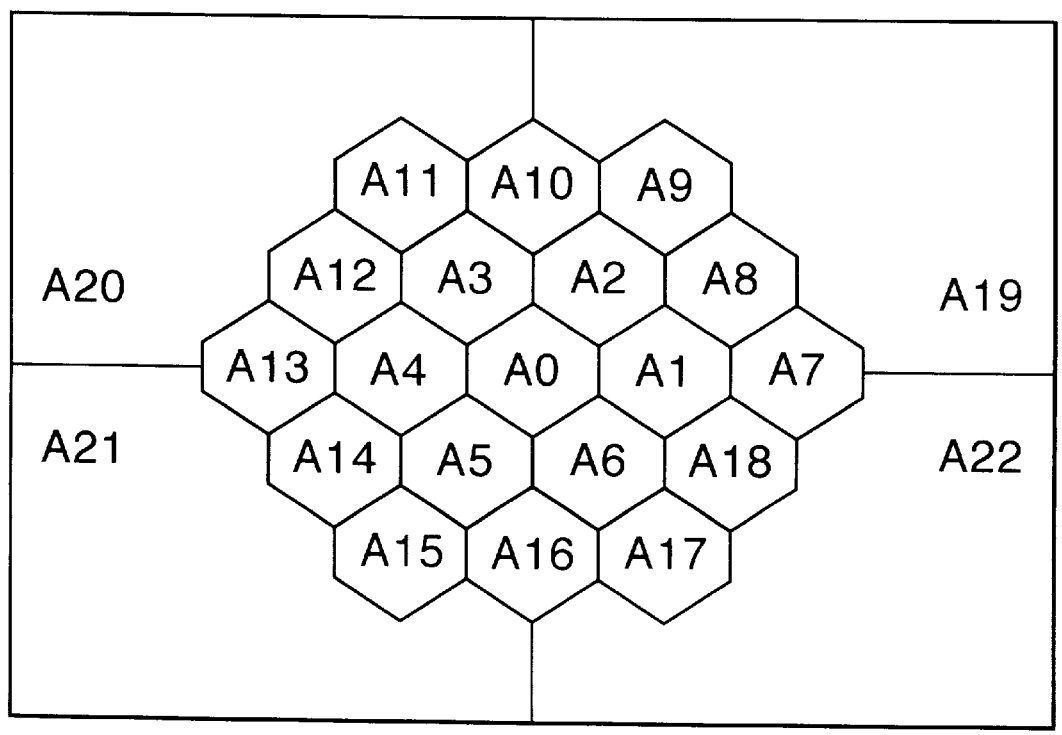
FIG. 5 shows the manner in which the image plane of a light measuring sensor shown in FIG. 1 is divided.

FIG. 5 shows a divided state of a light measuring area on the photo-taking image plane. The photo-taking image plane is divided into 23 areas, i.e., areas A0 to A22. The multi-divided light measuring sensor 7 is arranged to be capable of measuring the luminance of each of the light measuring areas which are arranged to be conjugate to the photo-taking image plane.

Referring again to FIG. 1, reference numeral 8 denotes a shutter, and reference numeral 9 denotes a photosensitive member which is composed of a silver-halide film or the like.

The main mirror 2 is arranged as mentioned above to pass about one half of a light flux coming from the object even when it is in the obliquely set position. A sub-mirror 25 is arranged to bend downward the light flux from the object to lead it toward a focus detecting unit 26. The focus detecting unit 26 is composed of a secondary image forming mirror 27, a secondary image forming lens 28, a focus detecting sensor 29, etc.

The focus detecting optical system, which is composed of the secondary image forming mirror 27 and the secondary image forming lens 28, is arranged to make a secondary image forming plane of the photo-taking optical system on the focus detecting sensor 29 of the focus detecting unit 26. The focus detecting unit 26 is arranged to detect the focusing state of the object obtained within the photo-taking image plane by the known phase difference detecting method. The camera system thus includes an automatic focus detecting device for controlling the focus adjusting mechanism of the photo-taking lens according to the focusing state of the object detected by the focus detecting unit 26.

The automatic focus detecting device is arranged to detect focusing states obtained at seven points A0 to A6 within the photo-taking image plane shown in FIG. 5.

A light measuring lens 23 is arranged to measure the amount of light reflected from the surface of the film 9 in combination with a film-surface-reflected light measuring sensor 24. The light measuring lens 23 and the film-surface-reflected light measuring sensor 24 are used for the so-called TTL light control in which an apposite amount of flash light is obtained by measuring an amount of exposure by utilizing a diffused reflection of light which reaches the film surface during an exposure.

A mount contact group 10 is arranged in a known manner to be used as an interface between the camera body 1 and the photo-taking lens. The lens barrel 11, which is mounted on the camera body 1, contains the photo-taking lens which is composed of lens groups 12, 13 and 14. The first lens group 12 is arranged to permit a focus position on the photo-taking image plane to be adjusted by moving to the right or left on an optical axis. The second lens group 13 is arranged to permit a magnification on the photo-taking image plane, i.e., the focal length of the photo-taking lens, to be varied by moving to the right or left on the optical axis. The third lens group 14 is fixed. The photo-taking lens further includes a diaphragm 15.

A first lens group (focus) driving motor 16 is arranged to move the first lens group 12 to the right or left for automatic adjustment of the focus position in accordance with an automatic focus adjusting action. A diaphragm driving motor 17 is arranged to open or stop down the aperture of the diaphragm 15.

The external flash device 18 is arranged to control light emission in accordance with a signal from the camera body 1. In the case of FIG. 1, the flash device 18 is electrically connected to the camera body 1 by mounting the flash device 18 directly on an accessory shoe of the camera body 1. However, the flash device 18 either may be disposed away from the camera body 1 to be connected to the camera body 1 through some connection cord or located spatially away from the camera body 1 to be connected through optical communication or the like.

A xenon lamp 19 is arranged to convert electric current energy into light emission energy. A reflector 20 and a Fresnel lens 21 are arranged to jointly act to efficiently converge the light emission energy toward the object. A light emission part which is composed of the xenon lamp 19, the reflector 20 and the Fresnel lens 21 is arranged to serve also as a transmission part for optical communication.

A flash device connecting contact group 22 is arranged in a known manner to be an interface between the camera body 1 and the flash device 18.

A glass fiber line 30 is arranged to guide the light emitted from the xenon lamp 19 to a first sensor (PD1) 31 for monitoring. The first sensor (PD1) 31 is arranged to directly measure the amount of light during the preliminary light emission or the amount of light during the main light emission of the flash device 18 and is used for control over the amount of light emission during the main light emission. A second sensor (PD2) 32 is arranged also to monitor the light emitted from the xenon lamp 19. The light emission current of the xenon lamp 19 can be restricted according to the output of the second sensor (PD2) 32 for flat light emission whereby the amount of light emission of the flash device 18 is kept unvarying.

A light receiving sensor 33 is provided for optical communication with another flash device.

An illumination angle (flash zoom) adjusting mechanism 34 is arranged to move the reflector 20 back and forth to adjust the illumination angle of the flash light emission to the focal length of the photo-taking lens to make it apposite to the image plane.

Among members that are essential in carrying out the invention, only optical and mechanical members are shown in FIG. 1. Electric circuit members which are necessary are omitted from FIG. 1.

Figure 2:
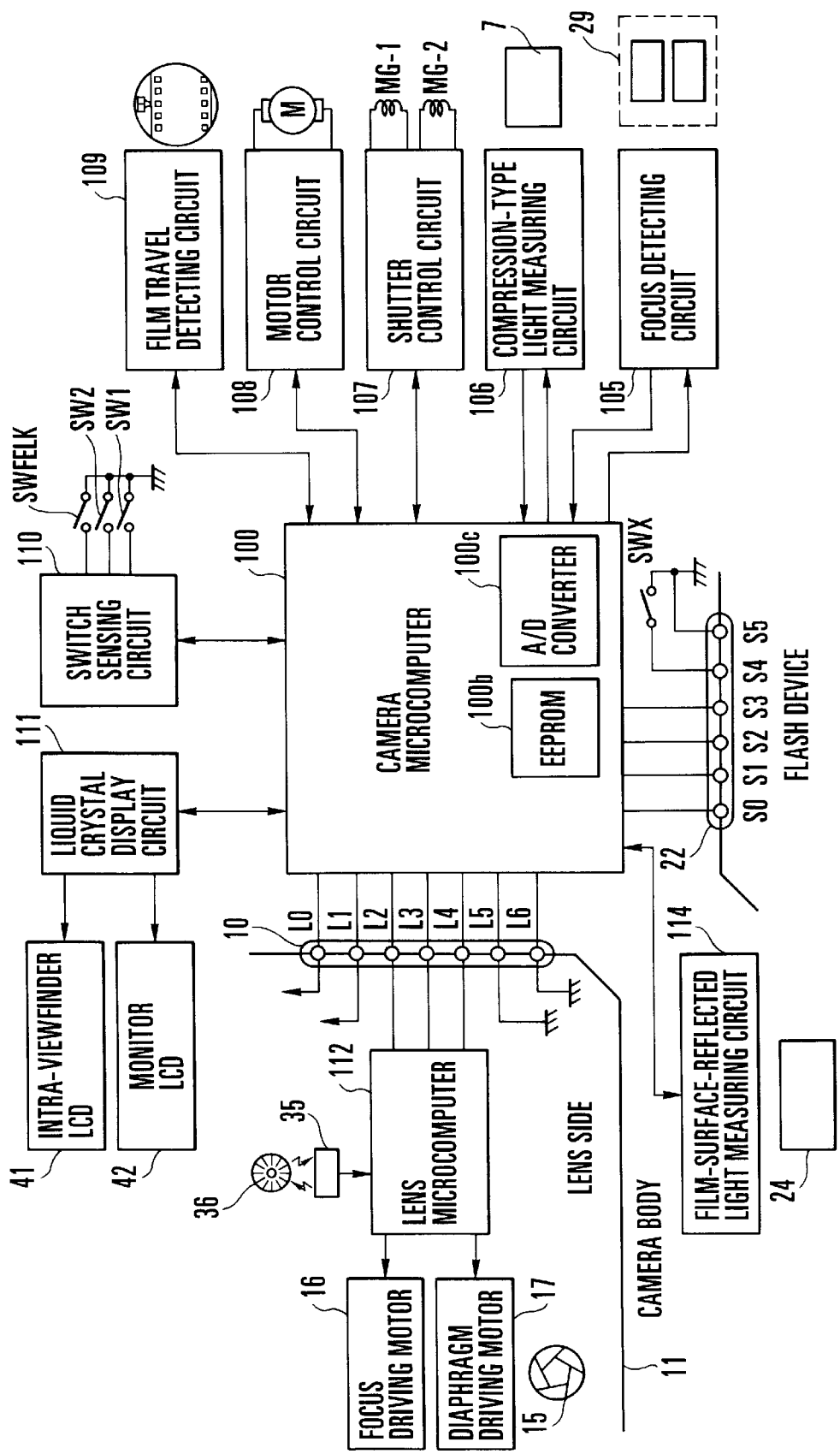
FIG. 2 is a block diagram showing the electric circuitry of a camera body shown in FIG. 1.
Figure 3:
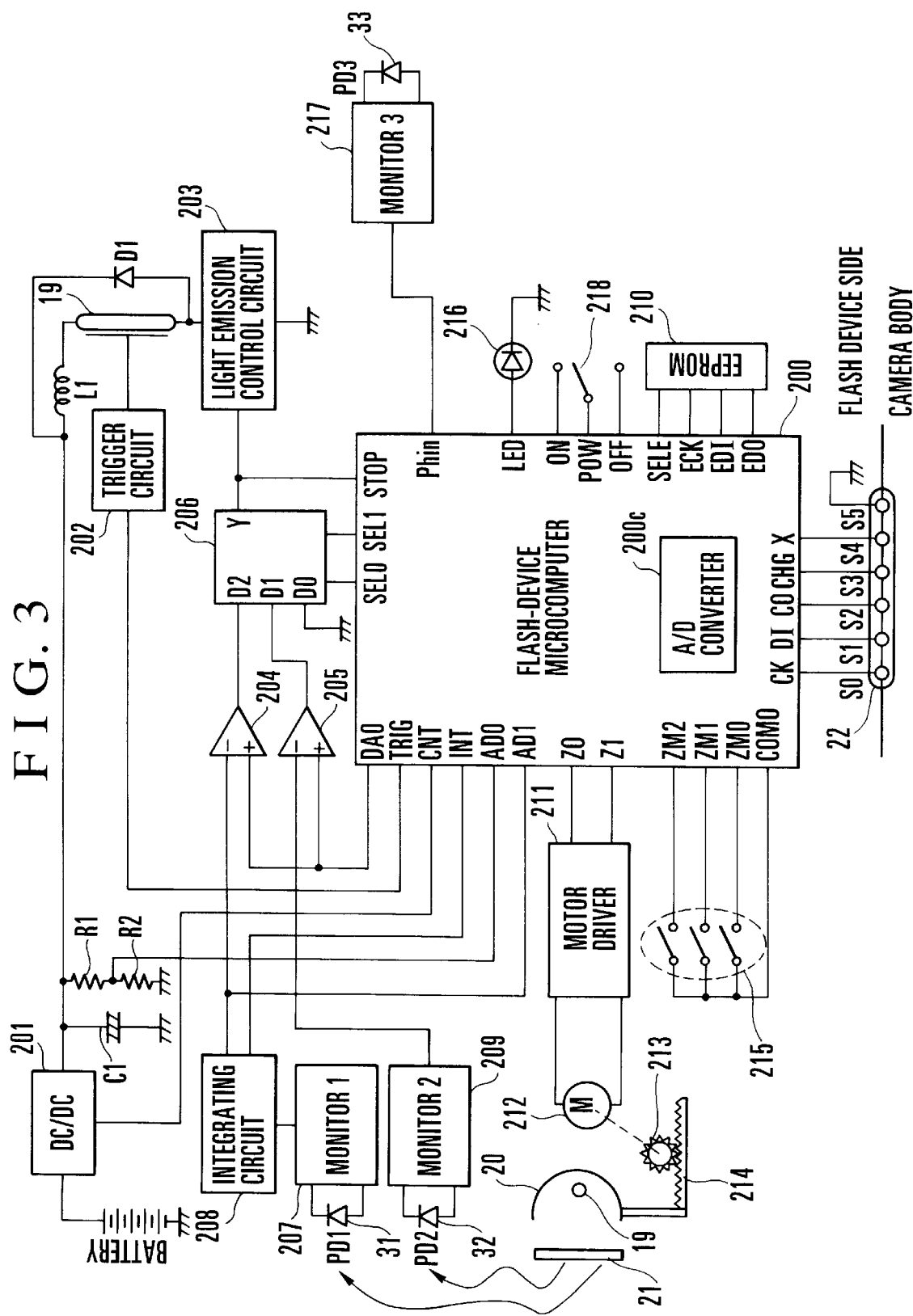
FIG. 3 is a block diagram showing the electric circuitry of a flash device shown in FIG. 1.

The electric circuits of the flash-device/camera system according to the first embodiment are shown in FIGS. 2 and 3. FIG. 2 is a block diagram showing circuits which are disposed on the side of the camera body and also on the side of the photo-taking lens. FIG. 3 is a block diagram showing the circuits disposed on the side of the flash device. In FIGS. 2 and 3, the same members as those shown in FIG. 1 are indicated by the same reference numerals and symbols.

Referring to FIG. 2, a camera microcomputer 100 is arranged to control actions to be performed within the camera body 1 according to a software program.

An EEPROM 100b is arranged to be capable of storing information on matters relative to photo-taking, such as the number of frames of film, etc.

An A/D converter 100c is arranged to A/D (analog-to-digital) convert analog signals coming from a focus detecting circuit 105 and a compression-type light measuring circuit 106. The camera microcomputer 100 sets the camera system in various states by processing data obtained by the A/D conversion.

To the camera microcomputer 100 are connected the focus detecting circuit 105, the compression-type light measuring circuit 106, a shutter control circuit 107, a motor control circuit 108, a film travel detecting circuit 109, a switch sensing circuit 110 and a liquid crystal display circuit 111. Signal transmission is made between the photo-taking lens and the camera body 1 through a mount contact group 10. With the flash device 18 directly mounted on the camera body 1, transmission of signals is made between the camera body 1 and the flash device 18 through the flash device contact group 22.

As mentioned above, the focus detecting sensor 29 is arranged to detect the focusing state as obtained at each of the seven points A0 to A6 within the photo-taking image plane of the viewfinder. The focus detecting sensor 29 has pairs of sensor elements. Each pair of the sensor elements are arranged to be corresponding to each of focus detecting points. The focus detecting circuit 105 is arranged to control, according to signals from the camera microcomputer 100, the accumulating action of the focus detecting sensor 29 and a reading action thereon and to obtain photoelectrically-converted pixel information. The pixel information is sent to the camera microcomputer 100. Upon receipt of the pixel information, the camera microcomputer 100 A/D-converts the pixel information and detects a focusing state therefrom by the known phase-difference detecting method. Then, in accordance with the result of focus detection, the camera microcomputer 100 exchanges signals with a lens microcomputer 112 to cause the lens microcomputer 112 to adjust the focus of the photo-taking lens as necessary.

The compression-type light measuring circuit 106 is arranged to send to the camera microcomputer 100, as a luminance signal indicating the luminance of each of the divided areas, the output of the multi-divided light measuring sensor 7 which divides the image plane into a plurality of areas as mentioned above.

The compression-type light measuring circuit 106 outputs the luminance signal obtained both in a normal state in which the luminance is obtained without the preliminary flash light emission and in a state of having the preliminary flash light emission toward the object. The camera microcomputer 100 A/D-converts the luminance signal and performs arithmetic operations to obtain an aperture value and a shutter speed for adjustment of a photo-taking exposure and also to obtain an amount of flash light emission to be made at the time of exposure.

The shutter control circuit 107 is arranged to carry out an exposure by allowing a leading shutter curtain (MG-1) and a trailing shutter curtain (MG-2) to travel according to signals from the camera microcomputer 100.

The motor control circuit 108 is arranged to move the main mirror 2 up and down, to charge the shutter and to transport the film by controlling a motor M according to signals from the camera microcomputer 100. The film travel detecting circuit 109 is arranged to detect whether one frame portion of the film has been wound up when the film is transported and send a signal to the camera microcomputer 100 indicating completion of the one-frame winding action on the film.

A switch SW1 is arranged to be turned on, to cause light-measuring and AF actions to begin, by a first stroke of a release button which is not shown. A switch SW2 is arranged to be turned on by a second stroke of the release button to cause an exposure action to begin. A switch SWFELK is arranged to be turned on by a pushbutton (not shown) to initiate an action of deciding and locking the amount of flash light emission to an amount decided by making preliminary light emission from the flash device 18 before an exposure.

Signals from the switches SW1, SW2 and SWFELK and other operation members of the camera body 1 are detected by the switch sensing circuit 110 and are sent from the switch sensing circuit 110 to the camera microcomputer 100. A switch SWX is arranged to turn on when the shutter is fully opened and to send a light emission timing signal for the main light emission to the flash device 18 in carrying out an exposure.

The liquid crystal display circuit 111 is arranged to control, according to signals from the camera microcomputer 100, displays to be made by an LCD 41 disposed within the viewfinder and another LCD 42 for a monitor which is not shown.

A film-surface-reflected light measuring circuit 114 is arranged to obtain, for the camera microcomputer 100, information on light measured by the film-surfacereflected light measuring sensor 24.

The film-surface-reflected light measuring sensor 24 is arranged to divide the inside of an image plane into a plurality of areas as shown in FIG. 5, in the same manner as the multi-divided light measuring sensor 7, and to measure the luminance of each of the areas arranged to be conjugate to the photo-taking image plane.

The arrangement of the lens barrel 11 is described below.

The camera body 1 and the lens barrel 11 are electrically connected to each other through the mount contact group 10. The mount contact group 10 is composed of a power supply contact L0 which is provided for the focus driving motor 16 and the diaphragm driving motor 17 which are disposed inside of the lens barrel 11, a power supply contact L1 which is provided for the lens microcomputer 112, a contact L2 which is provided for clock signals used for known serial data communication, a contact L3 which is provided for data transmission from the camera body 1 to the lens barrel 11, a contact L4 which is provided for data transmission from the lens barrel 11 to the camera body 1, a ground contact L5 which is provided for power to be supplied to the motors 16 and 17, and a ground contact L6 which is provided for power to be supplied to the lens microcomputer 112.

The lens microcomputer 112 is connected to the camera microcomputer 100 through the lens mount contact group 10 and is arranged to control adjustment of the focus of the photo-taking lens and the diaphragm 15 through the actions of the first lens group driving motor 16 and the diaphragm driving motor 17. A photo-detector 35 is arranged in combination with a pulse plate 36 which is secured, for example, to the motor shaft of the motor 16. The photo-detector 35 and the pulse plate 36 enable the lens microcomputer 112 to obtain information on the position of the first lens group 12 by counting the number of pulses in adjusting the focus of the photo-taking lens.

The flash device 18 is next described referring to FIG. 3.

A flash-device microcomputer 200 is arranged to control the flash device 18 in accordance with signals coming from the camera microcomputer 100. The amount of light emission, the intensity of flash light emission, the length of time of light emission and the illuminating angle of light emission are thus controlled by the flash-device microcomputer 200.

A DC/DC converter 201 is arranged to charge a main capacitor C1 according to an instruction of the flash-device microcomputer 200 by raising a battery voltage up to several hundred volts.

Voltage-dividing resistors R1 and R2 are provided for monitoring the voltage of the main capacitor C1 by the flash-device microcomputer 200. The flash-device microcomputer 200 indirectly monitors the voltage of the main capacitor C1 by A/D-converting the divided voltage with an A/D converter 200c which is disposed within the flash-device microcomputer 200. The flash-device microcomputer 200 controls the voltage of the main capacitor C1 to have it at a predetermined voltage by controlling the action of the DC/DC converter 201.

A trigger circuit 202 is arranged to output a trigger signal through the flash-device microcomputer 200 at the time of flash light emission according to the instruction of the camera microcomputer 100 and a signal from the switch SWX. In response to the trigger signal, a high voltage of several thousand volts is applied to the trigger electrode of the xenon lamp 19 to induce the discharge of the xenon lamp 19. Then, electric charge energy accumulated at the main capacitor C1 is discharged as light energy through the xenon lamp 19.

A light emission control circuit 203 which uses a switching element such as an IGBT (insulated-gate bipolar transistor) or the like is arranged to bring about a conductive state to allow a current flow to the xenon lamp 19 when the trigger voltage is applied at the time of light emission and to cut off the current flow to the xenon lamp 19 in bringing the light emission to a stop at the end of the light emission.

A comparator 204 is used for bringing the light emission to a stop when flash light is emitted, as will be described later. Another comparator 205 is used for controlling the intensity of light emission at the time of flat light emission, which will be described later.

A data selector 206 is arranged to select one of inputs from terminals D0, D1 and D2 according to selection signals SEL1 and SEL2 which come from the flash-device microcomputer 200 and to send the selected input to a terminal Y.

A monitor circuit 207 is provided for control over the light emission and is arranged to logarithmically compress and amplify the output of the first sensor (light receiving element) 31.

An integrating circuit 208 is arranged to integrate the output of the light emission control monitor circuit 207. A monitor circuit 209 is provided for control over the flat light emission and is arranged to amplify the output of the second sensor (light receiving element) 32. An EEPROM 210 is arranged to store data relative to a period of time of the flat light emission, etc.

The illuminating angle (flash zoom) adjusting mechanism 34 is composed of a known motor driver 211, a zoom driving motor 212, a pinion gear 213, a rack gear 214, a zoom position detecting encoder 215 which is arranged to detect the position of the reflector 20, etc.

An LED 216 is arranged to indicate that light emission is possible.

A monitor circuit 217 for optical communication is arranged to enable the flash-device microcomputer 200 to receive signals through optical communication by sending a signal of the light receiving sensor 33 to the flash-device microcomputer 200.

The terminals of the flash-device microcomputer 200 are next described as follows.

An input terminal CK is arranged to receive a synchronizing clock signal for serial communication with the camera body 1. An input terminal DI is arranged to receive data by the serial communication. An output terminal DO is arranged to output data by the serial communication. An output terminal CHG is arranged to send to the camera body 1 a signal in the form of a current indicating that the light emission of the flash device 18 is possible. An input terminal X is arranged to receive a light emission timing signal from the camera body 1. An output terminal ECK is arranged to send a communication clock signal for serial communication with some writable storage means such as an EEPROM or a flash ROM which is connected to the outside of the flash-device microcomputer 200. An input terminal EDI is arranged to receive serial data from the storage means. An output terminal EDO is arranged to send serial data to the storage means. An enable terminal SELE is arranged, for example, to enable communication with the storage means when it is at a low level and to disable the communication when it is at a high level.

In the first embodiment, the storage means is set outside of the flash-device microcomputer 200. The storage means, however, may be disposed within the flash-device microcomputer 200.

An input terminal POW is arranged to obtain information on the state of a power switch 218. An output terminal OFF is arranged to render the flash device 18 into an off-state when the terminal OFF is connected to the power switch 218. An output terminal ON is arranged to turn on the flash device 18 when the terminal ON is connected to the power switch 218. When the power is on, the terminal POW is connected to the terminal ON. In that instance, the terminal ON is in a high impedance state and the terminal OFF in a low impedance state. The relation between the high and low impedance states becomes converse when the power is off. A display output terminal LED is arranged to make a display indicating that light emission is possible.

An input terminal Phin is arranged to receive the optical communication.

An input terminal STOP is for receiving a light-emission stop signal and is arranged, for example, to bring about a state of stopping light emission when it is at a low level. Output terminals SEL0 and SEL1 are provided for selecting the inputs of the data selector 206 and are arranged, for example, to connect the terminal D0 to the terminal Y when the combination of the terminals SEL0 and SEL1 is (SEL1, SEL0)=(0, 0), to connect the terminal D1 to the terminal Y when the combination is (0, 1) and to connect the terminal D2 to the terminal Y when the combination is (1, 0).

An A/D output terminal DA0 is arranged within the flash-device microcomputer 200 to output the levels of comparison to be made by the comparators 204 and 205, in the form of analog voltages. A trigger signal output terminal TRIG is arranged to output a trigger signal which instructs the trigger circuit 202 to trigger light emission. An output terminal CNT is arranged to control and cause the DC/DC converter 201 to start and stop its oscillation. For example, a charging process is arranged to begin when the output terminal CNT is at a high level and to come to a stop when the terminal CNT is at a low level. A terminal INT is arranged to control and cause the integrating circuit 208 to start and reset its integrating process. The integrating process is arranged, for example, to be reset when the terminal INT is at a high level and to be allowed when the terminal INT is at a low level.

A/D input terminals AD0 and AD1 are arranged to convert voltage inputs into digital data to enable the microcomputer 200 to process these inputs. The terminal AD0 is provided for monitoring the voltage of the main capacitor C1 and the terminal AD1 is provided for monitoring the integration output of the integrating circuit 208.

Control output terminals Z0 and Z1 are for control over the motor driver 211 which drives the zoom driving motor 212. Input terminals ZM0, ZM1 and ZM2 are arranged to receive the output of the zoom position detecting encoder 215. A common terminal COMO is arranged to pull in a current corresponding to the ground level of the zoom position detecting encoder 215.

The actions of the flash device 18 are next described to further describe the circuits thereof.

Detection of a Light Emission Possible State

The flash-device microcomputer 200 has a divided voltage of the main capacitor C1 inputted to the AD0 port (terminal) to be A/D-converted there. When the voltage of the main capacitor C1 is found through this input to be equal to or more than a predetermined voltage level at which light emission is possible, the flash-device microcomputer 200 obtains a predetermined current from the terminal CHG and informs the camera body 1 that light emission is possible. Further, the terminal LED is set at a high level to light up the LED 216 to show a light emission possible state.

When the voltage of the main capacitor C1 is found to be lower than the predetermined voltage, the terminal CHG is set in a non-active state to cut off the current. The camera body 1 is then informed of a light emission impossible state. The terminal LED is set at a low level to put out the light of the LED 216 to show the light emission impossible state.

Setting the Illuminating Angle of the Flash Device

Information on the current zoom position is read from the terminals ZM0, ZM1 and ZM2. Then, the motor driver 211 is driven by sending signals through the terminals Z0 and Z1 in such a way as to adjust the current zoom position to a zoom position designated by the camera body 1 through serial communication.

Preliminary Flat Light Emission

When the flash device 18 is in the light emission possible state, the camera body 1 can instruct the flash device 18 to make preliminary light emission by communicating information on the intensity and period of time of the preliminary light emission.

The flash-device microcomputer 200 sets a predetermined voltage at the terminal DA0 in accordance with a signal coming from the camera body 1 indicating a predetermined light emission intensity signal. Next, low-level and high-level signals are outputted from the terminals SEL1 and SEL0 to select the input terminal D1. At this time, since the xenon lamp 19 is not emitting light as yet, there flows almost no photoelectric current at the light receiving element 32. No output of the monitor circuit 209 is inputted to an inverting input terminal of the comparator 205. The output of the comparator 205 is thus at a high level, which renders the light emission control circuit 203 conductive. When a trigger signal is outputted from the terminal TRIG, the trigger circuit 202 generates a high voltage to excite the xenon lamp 19, so that light emission begins.

After the lapse of a predetermined period of time from the generation of the trigger signal, the flash-device microcomputer 200 instructs the integrating circuit 208 to start its integrating action. In response to this instruction, the integrating circuit 208 begins to act to integrate the photoelectric output of the light receiving element 31, which is logarithmically compressed for integrating the amount of light. At the same time, a timer is caused to start a predetermined time count.

After the start of the preliminary light emission, the photoelectric current of the light receiving element 32 which is provided for control over the light emission intensity of the flat light emission increases, so that the output of the monitor circuit 209 rises. When the output of the monitor circuit 209 becomes higher than a voltage set at the non-inverting input terminal of the comparator 205, the level of the output of the comparator 205 becomes a low level. The low level output of the comparator 205 causes the light emission control circuit 203 to cut off the light emitting current of the xenon lamp 19, thereby cutting off a discharge loop. However, a circulating loop is formed by a diode D1 and a coil L1. The light emitting current gradually decreases after an overshoot caused by a circuit delay comes to settle down.

The light emission intensity decreases according to the decrease of the light emitting current. The photoelectric current of the light receiving element 32, therefore, decreases to lower the level of the output of the monitor circuit 209. When the output of the monitor circuit 209 becomes lower than a predetermined level of comparison, the output of the comparator 205 changes to a high level again. The high level output of the comparator 205 again renders the light emission control circuit 203 conductive to form the discharge loop of the xenon lamp 19. Then, the light emitting current increases to raise the light emission intensity.

The comparator 205 is thus arranged to repeat, in a short cycle, increasing and decreasing the light emission intensity above and below a predetermined comparison voltage set at the terminal DA0 of the microcomputer 200. At a result, flat light emission can be carried on almost unvaryingly at a desired light emission intensity.

Meanwhile, the above-stated timer counts the light emission time. When a predetermined preliminary light emission time has elapsed, the flash-device microcomputer 200 sets the terminals SEL1 and SEL2 at low levels to select the input terminal D0 of the data selector 206, i.e., to select a low level input of the data selector 206. This forcibly makes the level of output of the data selector 206 low. As a result, the discharge loop of the xenon lamp 19 is cut off to terminate light emission.

Upon completion of the light emission, the flash-device microcomputer 200 reads, from the A/D input terminal AD1, the output of the integrating circuit 208 which has integrated the amount of light during the preliminary light emission. Then, the integral value of the amount of light emission during the preliminary light emission is A/D-converted and read out as a digital value (INTp).

Main Light Emission Control

The camera microcomputer 100 obtains an apposite relative value ($\gamma$) of the amount of light emission of the main light emission to the amount of light emission of the preliminary light emission, on the basis of the reflection luminance values of the object obtained by the multi-divided light measuring sensor 7 when the preliminary light emission is made. Information on the apposite relative value ($\gamma$) is sent from the camera microcomputer 100 to the flash-device microcomputer 200.

The flash-device microcomputer 200 obtains an apposite integral value (INTm=INTp×$\gamma$) by multiplying the light measuring integral value (INTp) obtained at the time of the preliminary light emission by the apposite relative value ($\gamma$) obtained from the camera body 1. The apposite integral value (INTm) is set at the output terminal DA0.

A high level signal and a low level signal are next sent from the terminal SEL1 and SEL0 to select the input terminal D2. At this moment, since the integrating circuit 208 is in a state of being inhibited from acting, no output of the integrating circuit 208 is inputted to the inverting input terminal of the comparator 204, so that the output of the comparator 204 is at a high level. The light emission control circuit 203, therefore, becomes conductive.

When a trigger signal is sent from the terminal TRIG, the trigger circuit 202 generates a high voltage to excite the xenon lamp 19 to emit light. Then, after the lapse of ten odd usec during which a trigger noise settles to allow the light emission to actually begin, the flash-device microcomputer 200 sets the integration start terminal INT at a low level to cause the integrating circuit 208 to integrate the output of the sensor 31 through the monitor circuit 207. When the integral output of the integrating circuit 208 reaches a voltage set at the output terminal DA0, the output of the comparator 204 is inverted. The inversion of the output of the comparator 204 turns off the conductive state of the light emission control circuit 203 through the data selector 206. As a result, the light emission comes to a stop.

Meanwhile, the flash-device microcomputer 200 monitors the state of the terminal STOP. When the terminal STOP is inverted and the light emission comes to a stop, the flash-device microcomputer 200 set the terminals SEL1 and SEL0 at low levels to set a state of inhibiting forcible light emission. At the same time, the integration start terminal INT is inverted to bring the integrating action to an end. The process of light emission is thus terminated.

The main light emission thus can be controlled to have an apposite amount of light emission in the manner as described above.

Optical Communication

Optical communication data can be sent to some other flash device or devices arranged in a wireless manner by sending the pulses of the above-stated preliminary light emission in accordance with a prescribed protocol.

FIG. 4 shows the details of the multi-divided light measuring sensor 7 and the compression-type light measuring circuit 106.

Referring to FIG. 4, a sensor cell 301 which is a photodiode is arranged to have its anode side connected to the source of a reference voltage VREF and its cathode side to the inverting input terminal of an amplifier 303. When the sensor cell 301 is illuminated with light, a photoelectric conversion current Ip flows from the anode to the cathode.

A logarithmic compression diode 302 and an operational amplifier 303 constitute a logarithmic compression circuit in conjunction with the sensor cell 301. The output V1 of the operational amplifier 303 can be expressed as follows:

$$V1 = VREF - kt/q * (\ln(Ip/Is))$$

where Is: a saturated current in reverse direction of the logarithmic compression diode 30, k: a Boltzmann's constant, q: the amount of electric charge of electrons, and t: the absolute temperature.

Referring to FIG. 4, a diode 307 for compressive integration, an integration start switch 308, a capacity element 309 for integration, and a switch 310 for resetting the charge of the integration capacity element 309 jointly constitute a logarithmic compressing integrating circuit. First, the integration start switch 308 is turned off. The reset switch 310 is turned on. The integration capacity element 309 is reset to a potential VREF. After that, a logarithmic compressing integrating action can be started by turning the reset switch 310 off and turning the integration start switch 308 on.

After the lapse of a predetermined time T, the integration start switch 308 is turned off to bring the integrating action to an end. Assuming that an integral value of the photoelectric conversion current obtained during the integrating time T is Qp, the integral value Qp can be expressed as follows:

$$Qp = \int Ip\, dT$$

Then, the voltage V2 of the integration capacity element 309 obtained at this time is expressed as follows:

$$V2 = VREF - kt/q * (\ln(qQp/ktc + G(t)))$$

where c: the capacity of the integrating capacity element 309, and

G(t): a function related to temperature t.

The value of the function G(t) shown above is negligibly small as compared with the value qQp/ktc. Therefore, the voltage V2 can be approximated as follows:

$$V2 = VREF - kt/q * (\ln(qQp/ktc))$$

The voltage V2 thus becomes a value obtained by compressing the integral amount of the photoelectric converted current.

An operational amplifier 311 is arranged to output the compressed integral voltage V2 through a voltage follower. The elements 301 to 311 described above are arranged for each of divided areas of the multi-divided light measuring sensor 7. When one of the areas is selected by a decoder 312, the output of the integrating circuit is sent from a terminal VOUT to the camera microcomputer 100 through an operational amplifier 313.

The decoder 312 contains a shift register and is arranged to select, according to signals RES and "clock" coming from the camera microcomputer 100, the outputs of the operational amplifier 311 serially for the light measuring areas A0 to A21 one after another.

Next, the operation of the flash-device/camera system according to the first embodiment of the invention is described with reference to FIGS. 6 to 11. FIGS. 6 to 11 are flow charts showing mainly the operation of the camera microcomputer 100.

Referring first to FIG. 6, the camera operation starts at a step S100. At a step S101, flags of varied kinds including a flag FELK which will be described later are cleared. At a step S102, a check is made for the state of the switch SW1, which is arranged to be turned on by the first stroke of the release button of the camera body 1. When the switch SW1 is turned on, the flow of operation proceeds to a step S103.

At the step S103, the camera microcomputer 100 causes the compression-type light measuring circuit 106 to measure light in a plurality of areas into which the image plane is divided. The camera microcomputer 100 then computes an exposure value and decides a shutter speed and an aperture value.

At a step S104, the camera microcomputer 100 causes the focus detecting circuit 105 to perform a focus detecting action by the known phase-difference detecting method. Since there are a plurality of focus detecting points, as mentioned in the foregoing, the first embodiment is arranged either to allow the operator of the camera to set a focus detecting point as desired or to carry out focus detection by a known automatic selecting algorithm which is based on a concept of giving priority to a nearer point.

At a step S105, the camera microcomputer 100 communicates with the photo-taking lens to have the focus of the photo-taking lens adjusted in such a way as to have an in-focus state obtained for the focus detecting point selected.

At a step S106, the camera microcomputer 100 makes a check for the state of the switch SW2, which is arranged to be turned on by the second stroke of the release button. If the switch SW2 is found to be in its off-state, the flow proceeds to a step S107. If the switch SW2 is in its on-state, the flow proceeds to a step S110.

At the step S107, the camera microcomputer 100 makes a check for the button switch SWFELK. If the button switch SWFELK is found to be in its off-state, the flow returns to the step S102. If the button switch SWFELK is found to be in its on-state, the flow proceeds to a step S108.

The button switch SWFELK is arranged to be used by the operator when it is desired to decide an amount of flash light emission before an exposure. In that case, the button switch SWFELK is pushed with an object to which the flash light is desired to be apposite placed in the central part of the image plane. After that, picture framing may be changed as desired before a shutter release button is pushed for an exposure.

At the step S108, the camera microcomputer 100 causes the flash device 18 to make preliminary light emission. The preliminary flash light is reflected by the object of shooting. The compression-type light measuring circuit 108 is caused to measure the reflected light. The amount of light to be emitted from the flash device 18 for an exposure is determined according to the result of the light measurement. The details of this step will be described later with reference to FIG. 7.

At a step S109, the camera microcomputer 100 sets a flag FELK (flg-FELK) to "1" to indicate that the preliminary light emission has been made once. After that, the flow returns to the step S102.

At the step S110, with the switch SW2 found to have been turned on at the step S106, the camera microcomputer 100 makes a check for the state of the flag FELK. If the flag FELK is at "1" thus indicating that the preliminary light emission has already been made, the flow jumps to a step S112 by skipping a step S111. If the flag FELK is found to be at "0", the flow proceeds from the step S110 to the step S111.

At the step S111, the same actions as those of the step S108 are executed.

At the step S112, the camera microcomputer 100 causes exposure actions to be carried out. To be more specific, the main mirror 2 is moved upward to retract it from a photo-taking optical path together with the sub-mirror 25. The photo-taking lens is controlled to adjust the aperture position of the diaphragm 15. The shutter control circuit 107 is controlled to give a shutter speed value TV decided. When the shutter is operated, the switch SWX turns on, in synchronism with arrival of the shutter at a full open position, to send a signal to the flash device 18. By this signal, the flash device 18 is instructed to make main light emission.

Since the camera system includes a plurality of flash devices 18, the flash-device microcomputer 200 of each flash device 18 controls the main light emission on the basis of the amount of light emission designated by the instruction coming from the camera body 1.

At the last step S113, upon completion of the exposure, the main mirror 2 and the sub-mirror 25 which have been retracted from the photo-taking optical path are moved back to their obliquely set positions in the optical path. The motor control circuit 108 and the film travel detecting circuit 109 are caused to have one frame portion of the film wound up.

The subroutine of the steps S108 and S111 of FIG. 6 is as described below with reference to FIG. 7.

Figure 7:
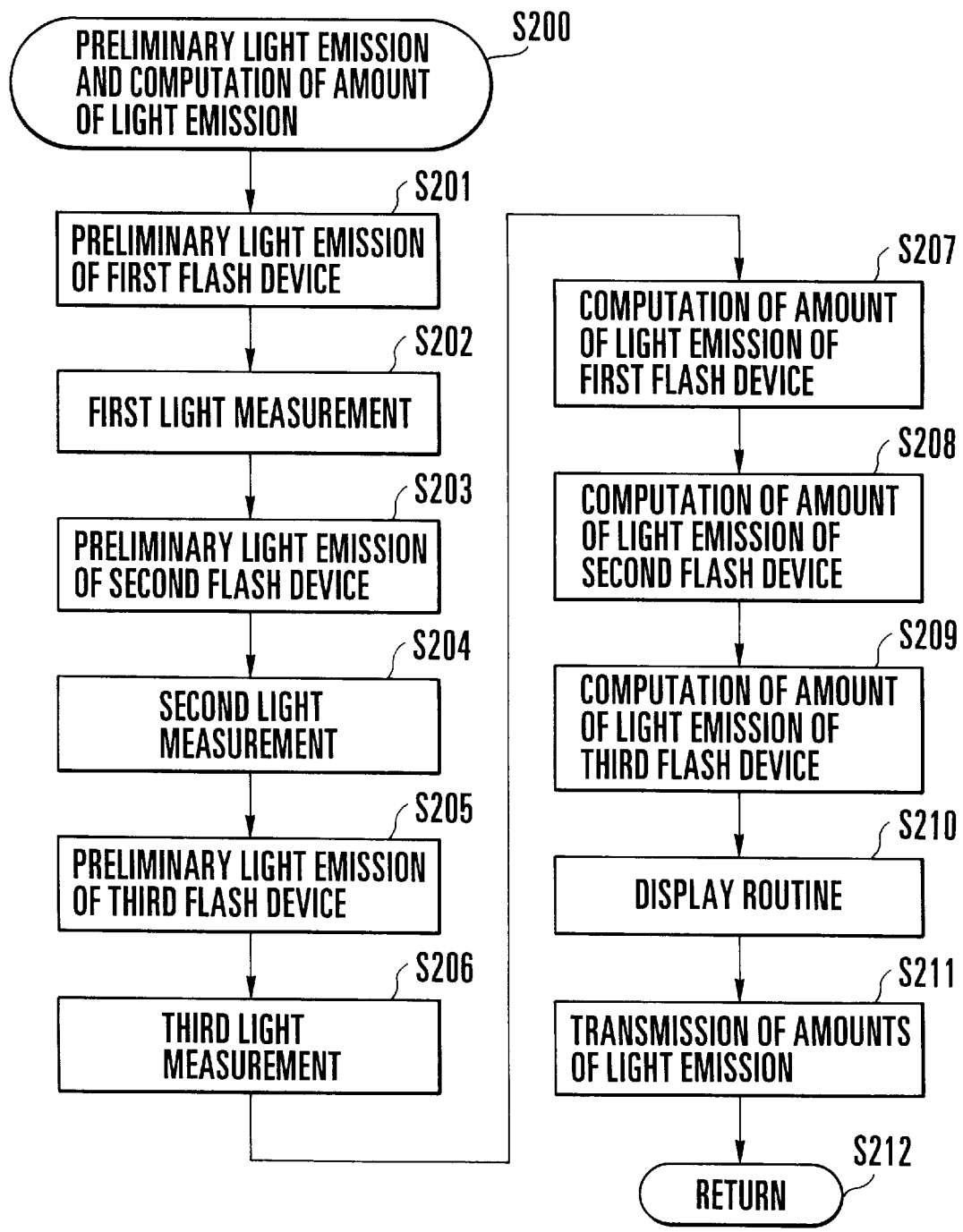
FIG. 7 is a flow chart showing a subroutine of a step of FIG. 6 which is provided for the preliminary light emission and the computation of the amount of light emission.

At a step S200 of FIG. 7, the subroutine for the preliminary light emission and the computation of the amount of light emitting begins. At a step S201, the camera microcomputer 100 communicates with the flash-device microcomputer 200 through the flash device contact group 22. The first flash device which is mounted on the camera body as shown in FIG. 18 is instructed to make the preliminary (flat) light emission.

Figure 18:
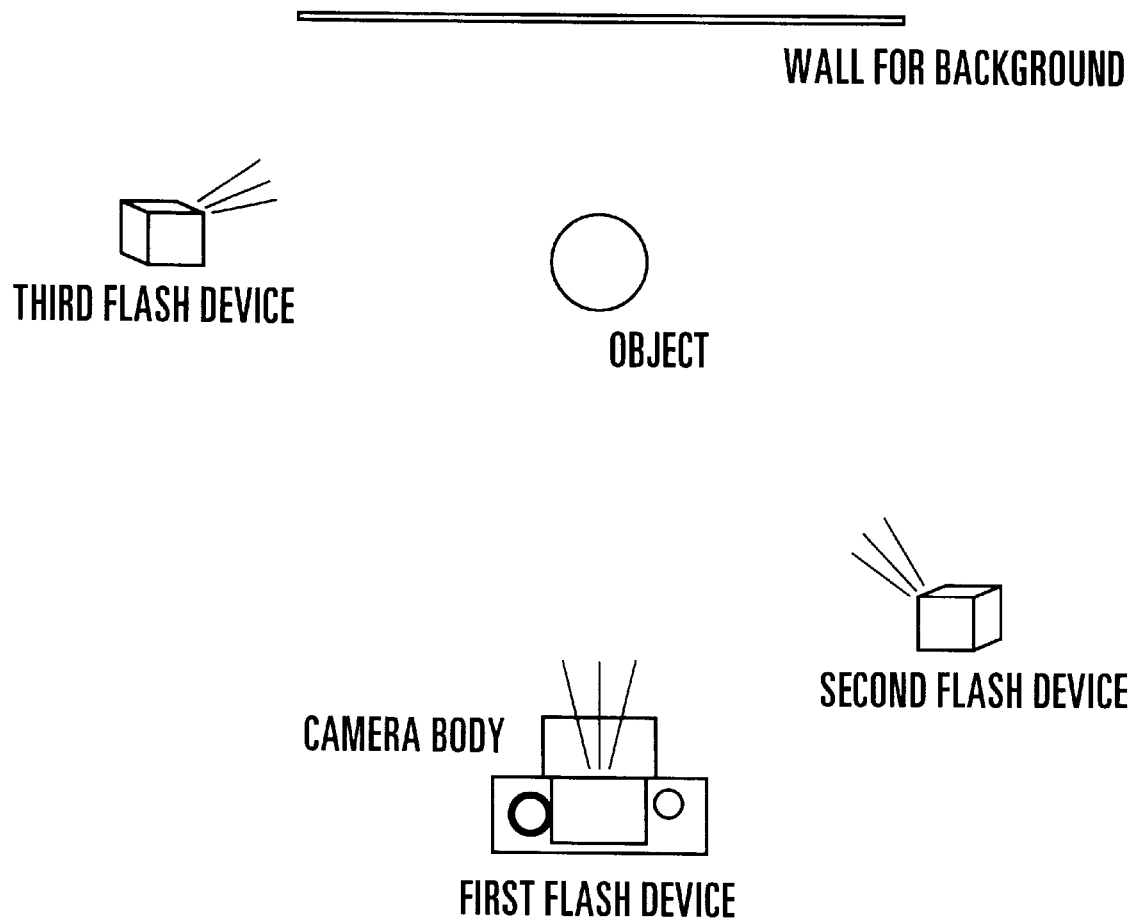
FIG. 18 schematically shows the disposition of flash devices in the multi-flash-device photography according to each embodiment of the invention.

In the case of FIG. 18, it is only the first flash device that is used for illuminating the object in the direction of the photo-taking optical axis. However, in some other cases, other flash devices may be wirelessly arranged in the neighborhood of the camera body to illuminate the object in about the same direction as the first flash device (hereinafter, these flash devices are referred to as the first flash device group). In such a case, upon receipt of the above-stated instruction, the flash-device microcomputer 200 sends an instruction, by optical communication, to each wireless flash device of the first flash device group to cause it to make preliminary light emission by using its light emitting part which is also composed of the members 19 to 21.

The above-stated optical communication is not necessary if the first flash device group includes only the flash device directly connected to the camera body. However, in a case where the wireless flash devices of the first flash device group are in a stand-by state, each of them also makes preliminary light emission according to the instruction. In a case where the flash device directly connected to the camera body belongs to the first flash device group, the directly-connected flash device of course also makes the preliminary light emission.

At a step S202, the camera microcomputer 100 obtains information on the object luminance for the plurality of divided areas of the image plane from the compression-type light measuring circuit 106 by A/D converting the information. At this time, the light measuring action is performed before the preliminary light emission and also while the preliminary light emission is in process to obtain measured light values for each of the areas. Then, information on the luminance of the preliminarily emitted light as reflected by the object is obtained by obtaining a difference between the measured light values in each of the areas. This process can be expressed as follows:

$$\Delta Fn \leftarrow Fan - Fbn$$

where n: each area, n=0 to 18, $\Delta Fn$: object-reflected light component of the preliminary light emission for the area n, Fan: information on object luminance obtained for the area n while the preliminary light emission is in process, and Fbn: information on object luminance obtained for the area n immediately before the preliminary light emission.

This subtraction is made by a linear operation.

A step S203 is similar to the step S201. In case where a second wireless flash device is arranged, as shown in FIG. 18, or where a plurality of flash devices are arranged to illuminate the object in about the same direction as the second flash device, in a second flash device group, the second flash device or the second flash device group is instructed through the optical communication to make flat preliminary light emission.

At a step S204, information on the luminance of object-reflected light resulting from the preliminary light emission made by the second flash device group is obtained in the same manner as the step S202.

At steps S205 and S206, information on the luminance of object-reflected light resulting from preliminary light emission made by a third wireless flash device or a third flash device group is obtained in the same manner as the steps S201 and S202.

At a step S207, the camera microcomputer 100 computes an amount of flash light emission of the main light emission of the first flash device from the luminance information ΔFn on the object-reflected light of the preliminary light emission obtained at the steps S202, S204 and S206. The details of the step S207 are described below with reference to FIG. 8.

Figure 8:
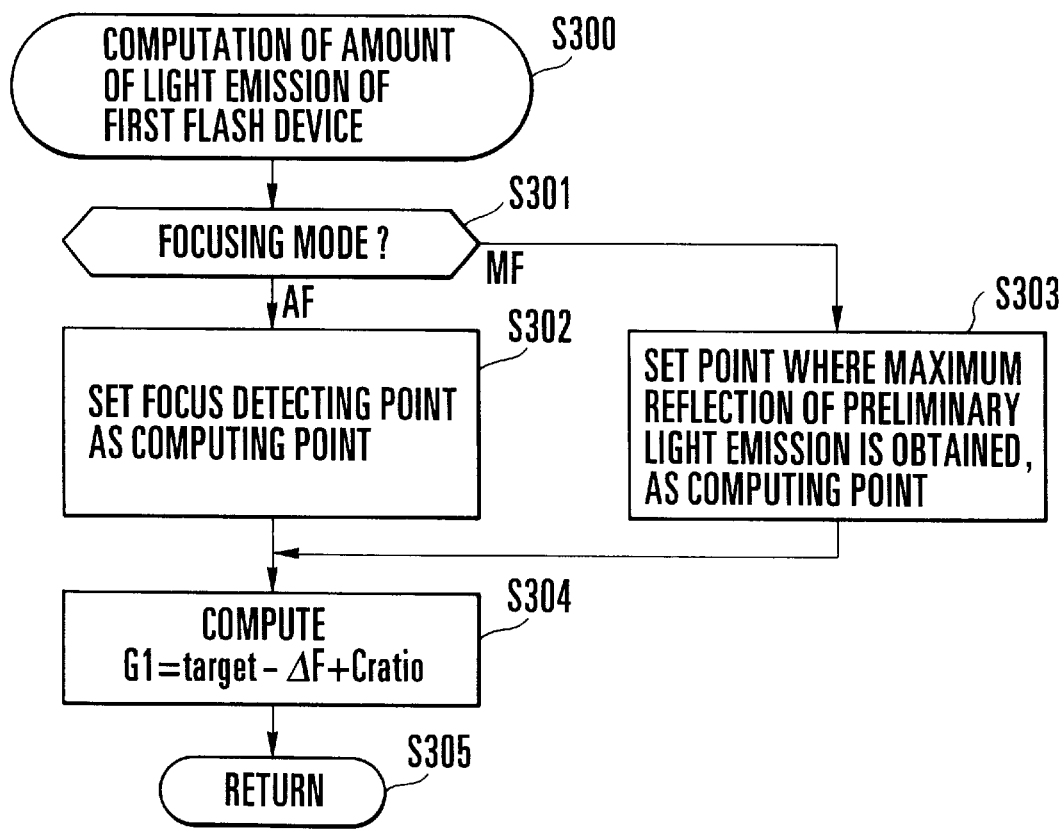
FIG. 8 is a flow chart showing a subroutine of a step of FIG. 7 which is provided for the computation of the amount of light emission of a first flash device.

At a step S300 of FIG. 8, a subroutine for the computation of the amount of light emission of the first flash device begins.

At a step S301, the camera microcomputer 100 makes a check to find if a focusing action is to be performed in an automatic focusing (AF) mode or in a manual focusing (MF) mode. If the automatic focusing mode is selected, the flow proceeds to a step S302. If the manual focusing mode is selected, the flow proceeds to a step S303.

At the step S302, the camera microcomputer 100 decides a focus detecting point which has been selected from among the plurality of light measuring areas (points) at the step 104 to be a center point in determining the amount of flash light emission. This step is based on an idea that the flash light should be used for appositely illuminating a main object of shooting, because an object mainly desired by the operator is located at the focus detecting point.

At a step S303, with the manual focusing mode selected at the step S301, the camera microcomputer 100 decides one of the plurality of light measuring areas where the preliminary light emission is reflected in a maximum amount among the plurality of light measuring areas to be a point for which a computing (arithmetic) operation is to be performed. This step is based on the concept that, since an object which is nearest to the camera most probably becomes the main object of shooting among others, the flash light emission should be arranged to be apposite to that object.

At a step S304, the camera microcomputer 100 computes an amount of flash light emission on the basis of the light measuring area decided at the step S302 or S303. The amount of light emission is computed by obtaining a ratio of the amount of main flash light emission to the amount of preliminary light emission, as follows:

$$G1=\text{target}-\Delta F+\text{Cratio}$$

where "target": an exposure amount determined according to an aperture value and a shutter time (speed) to be actually used for shooting, ΔF: the amount of reflected light of the preliminary light emission (the value ΔF obtained for a light measuring area decided at the step S302 or S303), and Cratio: a correction value for the amount of flash light emission.

The correction value "Cratio" for the amount of flash light emission is added, for example, in a case where two flash devices such as the first and second flash devices as shown in FIG. 18 are used for the purpose of making the total of the amounts of flash light emission of the first and second flash devices apposite to an exposure. Assuming that the light emission ratio between the amounts of flash light emission of the first and second flash devices is 8:1, the apposite amount of light emission by the first flash device is set to an amount of light emission corresponding to 8/9 of the apposite exposure amount. Therefore, assuming that this is expressed in a number of steps, to have the brightness or light amount expressed by the exponents of 2 in such a way as to express its increase by two times as one step, its increase by four times as two steps, its increase by eight times as three steps, its decrease to 1/2 as −1 step, its decrease to 1/4 as −2 steps, and its decrease to 1/8 as −3 steps, the flash light amount correcting value "Cratio" can be expressed as follows:

$$\log_2(8/9)=-0.16$$

In that case, the ratio G1 of the first flash device becomes as expressed below:

$$G1=\text{target}-\Delta F+(-0.16)$$

In the case of the second flash device, the correction value "Cratio" for obtaining the ratio G2 of the second flash device becomes as expressed below:

$$\log2\ (1/9)=-3.17$$

The amounts of flash light emission of these flash devices are corrected respectively by these numbers of steps to make a total amount of flash light emission apposite.

Figures 14, 15:
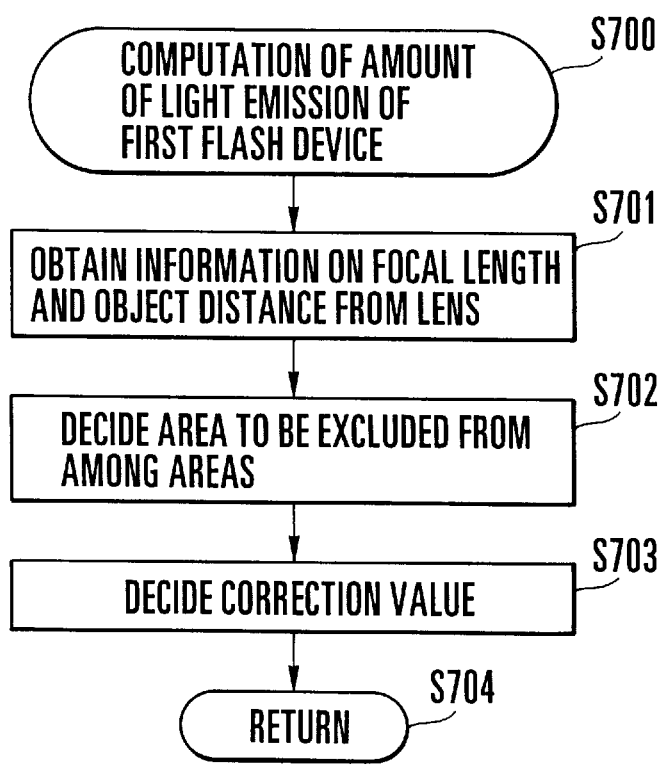
FIG. 14 is a table showing light amount ratios to be set in the first embodiment of the invention.
FIG. 15 is a flow chart showing a subroutine for the computation of the amount of light emission of a first flash device in a flash-device/camera system according to a second embodiment of the invention.

FIG. 14 shows in a table the numbers of steps of correction amounts required for light emission ratios. The amounts of flash light emission can be adequately controlled according to the ratios listed in the table of FIG. 14.

In a case where flash light illumination is to be made with three flash light sources including the first, second and third flash devices, a total of three amounts of flash light emission can be adequately controlled in the same manner as described above. The same control is of course applicable to other cases where four or more flash devices are employed.

It is possible to use some correction value decided by the operator in addition to the flash light amount correction value "Cratio". The amount of flash light emission may be corrected by some other additional correcting method, such as decreasing the flash light amount according to the condition of external light.

The ratio G1 may be computed for one computing point (light measuring area). However, this ratio also may be computed in some other suitable methods. For example, a weighted mean of ratios G1 for the computing point and for other points around it may be used, or the smallest value of these ratios G1 may be selected.

At a step S305, after completion of the step S304, the subroutine for the computation of the amount of light emission of the first flash device comes to an end.

The flow then returns to the steps of FIG. 7. At a step S208, the camera microcomputer 100 computes an amount of flash light emission of the main light emission of the second flash device from the information on the luminance of object-reflected light of the preliminary light emission obtained at the step S204.

The details of the step S208 are described below with reference to FIG. 9.

Figure 9:
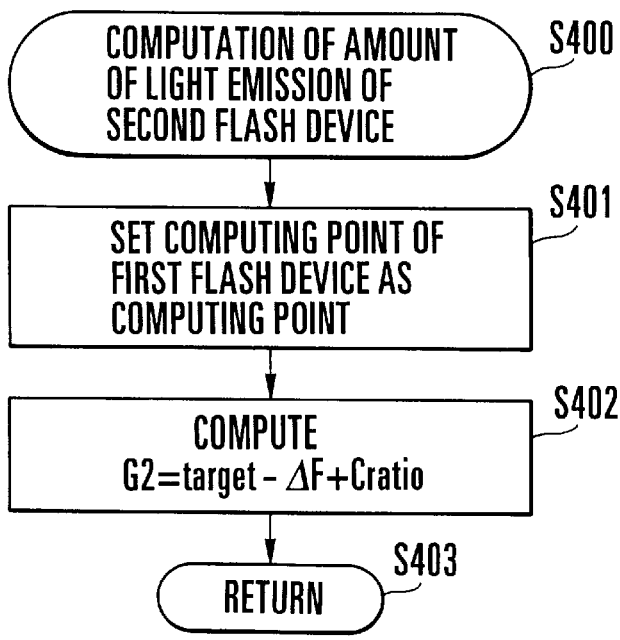
FIG. 9 is a flow chart showing a subroutine of a step of FIG. 7 which is provided for the computation of the amount of light emission of a second flash device.

At a step S400 of FIG. 9, a subroutine for the computation of the amount of light emission of the second flash device begins. At a step S401, since the second flash device is arranged to illuminate the same object as the first flash device as shown in FIG. 18, the camera microcomputer 100 decides the same point as the computing point decided at the step S302 or S303 or a point related to the same point to be the computing point for the second flash device.

At a step S402, the camera microcomputer 100 computes an amount of flash light emission on the basis of the light measuring area decided at the step S401. The light amount is computed by obtaining a ratio G2 between the preliminary light emission amount and the main light emission amount in the same manner as at the step S304 of FIG. 8, as expressed below:

$$G2 = \text{target} - \Delta F + \text{Cratio}$$

The correction value "Cratio" is −3.17 in the above-stated case.

As in the case of the ratio G1, although the ratio G2 may be computed for one computing point, it also may be computed in some other suitable methods. For example, a weighted mean of ratios G2 for the computing point and for other points around it may be used, or the smallest value of these ratios G2 may be selected.

At a step S403, the subroutine for the computation of the amount of light emission of the second flash device is terminated.

The flow then returns to the steps of FIG. 7.

At a step S209, the camera microcomputer 100 computes an amount of flash light emission of the main light emission of the third flash device from the information on the luminance of object-reflected light of the preliminary light emission obtained at the step S206.

The details of the step S209 are described below with reference to FIG. 10.

Figure 10:
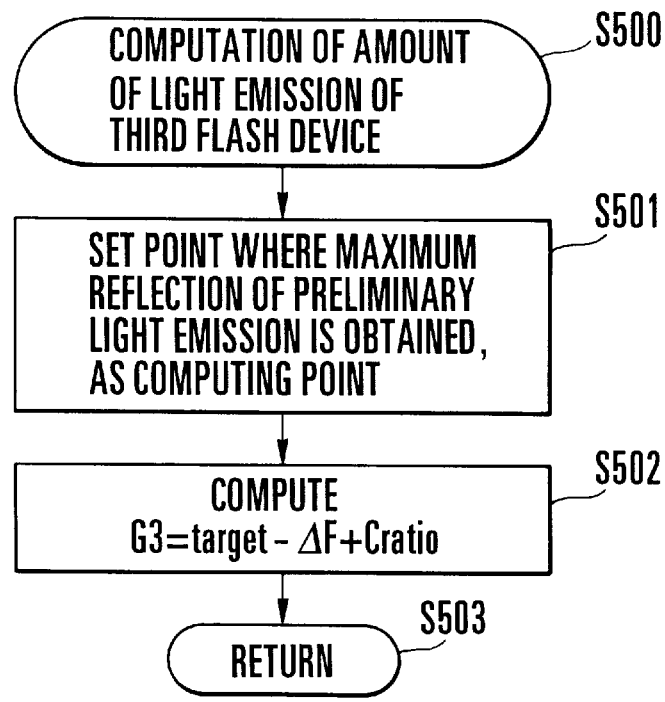
FIG. 10 is a flow chart showing a subroutine of a step of FIG. 7 which is provided for the computation of the amount of light emission of a third flash device.

At a step S500 of FIG. 10, a subroutine for the computation of the amount of light emission of the third flash device begins.

At a step S501, the camera microcomputer 100 decides an area for which the object-reflected light of the preliminary light emission shows the largest value among the plurality of light measuring areas to be the computing point for the third flash device.

The computing point is selected in the above manner because, unlike the first and second flash devices, the third flash device is used for illuminating the background of the main object and the control is performed for an illumination apposite to the background.

At a step S502, the camera microcomputer 100 computes an amount of flash light emission on the basis of the light measuring area decided at the step S501.

The amount of flash light emission is computed by obtaining a ratio G3 between the preliminary light emission amount and the main light emission amount in the same manner as at the step S304 of FIG. 8, as expressed below:

$$G3 = \text{target} - \Delta F + \text{Cratio}$$

As in the case of the ratio G1, although the ratio G3 may be computed for one computing point, it may be computed in some other suitable methods. For example, a weighted mean of ratios G3 for the computing point and other points around it may be used, or the smallest value of these ratios G3 may be selected.

At a step S503, the subroutine for the computation of the amount of light emission of the third flash device is terminated.

Further, in a case where only the first and second flash devices exist, the steps S205, S206 and S209 are of course not executed.

The flow then returns to the steps of FIG. 7.

At a step S210, the camera microcomputer 100 makes a display to show whether or not an apposite amount of exposure intended by the operator can be attained at the time of exposure with the three flash devices used for the preliminary light emission. The details of the step S210 are described below with reference to FIG. 11.

Figure 11:
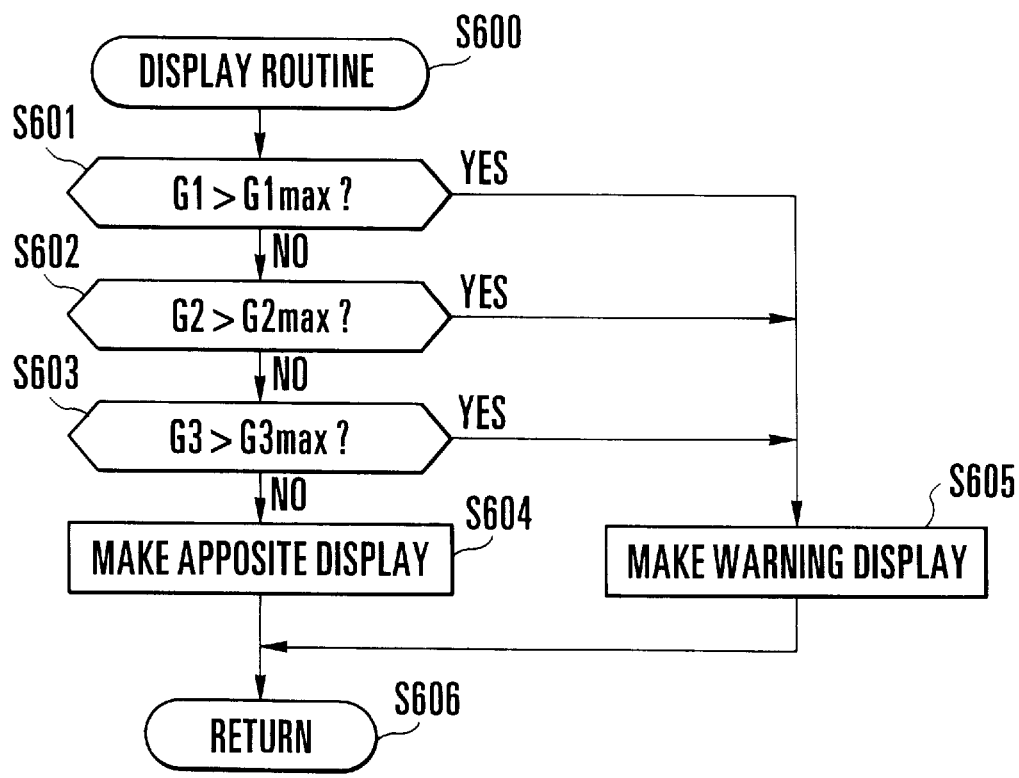
FIG. 11 is a flow chart showing the details of a display routine in the flow chart of FIG. 7.

At a step S600 of FIG. 11, a display routine begins.

At a step S601, the camera microcomputer 100 makes a check to find if the ratio G1 computed at the step S304 of FIG. 8 exceeds a maximum light emission amount G1max of the first flash device. The maximum light emission amount G1max is expressed also in the ratio of the main light emission amount to the preliminary light emission amount and is obtained by the camera microcomputer 100 through communication with the flash device.

If the ratio G1 exceeds the amount G1max, the computed amount of the main light emission of the first flash device is exceeding the possible amount of light emission and the apposite amount of exposure intended by the operator cannot be attained at the time of exposure. If the ratio G1 is found so, the flow branches to a step S605. If not, the flow proceeds to a step S602.

At the step S602, the camera microcomputer 100 makes a check to find if the ratio G2 computed at the step S402 of FIG. 9 exceeds a maximum light emission amount G2max of the second flash device. The maximum light emission amount G2max is expressed also in the ratio of the main light emission amount of the second flash device to the preliminary light emission amount and is obtained by the camera microcomputer 100 through communication with the flash device.

If the ratio G2 exceeds the amount G2max, the computed amount of the main light emission of the second flash device is exceeding the possible amount of light emission and the apposite amount of exposure intended by the operator cannot be attained at the time of exposure. Therefore, if the ratio G2 is found so, the flow branches to the step S605. If not, the flow proceeds to a step S603.

At the step S603, the camera microcomputer 100 makes a check to find if the ratio G3 computed at the step S502 of FIG. 10 exceeds a maximum light emission amount G3max of the third flash device. The maximum light emission amount G3max is expressed also in the ratio of the main light emission amount of the third flash device to the preliminary light emission amount and is obtained by the camera microcomputer 100 through communication with the flash device.

If the ratio G3 exceeds the amount G3max, the computed amount of the main light emission of the third flash device is exceeding the possible amount of light emission and the apposite amount of exposure intended by the operator cannot be attained at the time of exposure. Therefore, if the ratio G3 is found so, the flow branches to the step S605. If not, the flow proceeds to a step S604.

At the step S604, with none of the computed light emission amounts of the flash devices decided to be not exceeding their possible light emission amounts at the steps S601, S602 and S603, the camera microcomputer 100 causes a display to be made to show an apposite state.

At a step S605, the camera microcomputer 100 causes a warning display to be made when any of the computed light emission amounts is found to be exceeding the possible light emission amount at the step S601, S602 or S603.

FIGS. 12(A) to 12(D) show these displays.

FIG. 12(A) shows the entirety of a display part which is viewable by the operator looking into the viewfinder. The display is made by the liquid crystal display circuit 111 on the intra-viewfinder LCD 41 in accordance with the instruction of the camera microcomputer 100.

Referring to FIG. 12(A), reference numeral 400 denotes a viewfinder image plane arranged to enable the operator to see an object image formed on the focusing screen 3. Reference numeral 401 denotes an AE lock mark which is arranged to light up when an AE lock is applied. A flash device mark 402 is arranged to light up when the flash device becomes ready for light emission. A high-speed synchroflash mark 403 is arranged to light up when the shutter speed becomes faster than a flash synchronizing speed to bring the flash device into the so-called flat plane light emission mode.

A shutter time display part 403 is arranged to display a shutter time value. An aperture value display part 405 is arranged to display an aperture value. An exposure correction mark 406 is arranged to light up when an exposure correcting action is in process. An AF infocus display part 407 is arranged to light up when the object is in an in-focus state. A film frame remaining-number display part 408 is arranged to show the remaining number of frames of the film when the number becomes a one-place number. A scale display part 409 is arranged to show graduations for an exposure correcting amount display part 410 and a light control correcting amount display part 411.

The exposure correcting amount display part 410 is arranged to show an exposure correcting amount set by the operator and also to show a difference in number of steps between an apposite exposure amount and an exposure amount set in the manual exposure mode. The light control correcting amount display part 411 is arranged to show not only a light control correcting amount set by the operator but also to show that the FELK action is in process and a number of steps by which the amount of flash light is short of an apposite amount.

FIG. 12(B) shows a display of a state of having no exposure correction and having light control correction by −1 step. The state of having no exposure correction is displayed with an index 412 of the exposure correcting amount display part 410 located in the center "0" of the scale display part 409. The state of having light control correction by −1 step is displayed with an index 413 of the light control correcting amount display part 411 located at a graduation point "−1" of the scale display part 409.

FIG. 12(C) shows that the camera is in the FELK mode. As indicated by a mark 414, the light control correcting amount display part 411 is in a black-and-white inverted state, and the flash device mark 402 also lights up. This indicates the display of an apposite state to be made at the step S604 of the flow chart of FIG. 11. In a case where the flash light emission amount is insufficient with one flash device used in the FELK mode, a white void part indicated by the mark 414 comes down from the center point "0" to an extent corresponding to a number of steps by which the flash light emission amount is short of an apposite amount (the number of steps corresponding to "G1max–G1").

FIG. 12(D) shows the warning display to be made at the step S605 of the flow chart of FIG. 11. Although the light control correcting amount display part 411 is black-and-white inverted to indicate that the camera is in the FELK mode, the flash device mark 402 turns into a flickering mark 416 to indicate that the flash light is insufficient.

The display of the insufficiency of flash light can be simply made as described above if only one flash device is used. In a case where two or three flash devices are in use, an extremely complex arrangement becomes necessary for making a display showing which of the flash devices has an insufficient amount of flash light and by how much the insufficient amount is short of the apposite amount. Therefore, in the first embodiment, the above display with the flickering mark 416 is employed.

Referring again to FIG. 11, the display routine comes to an end at a step S606.

The flow then returns from the step S606 to the flow chart of FIG. 7.

At a step S211 of FIG. 7, the camera microcomputer 100 communicates with the flash-device microcomputer 200 of the first flash device through the flash device contact group 22 to send, as a command, the information on the ratios G1, G2 and G3 (amounts of light emission) computed for the first, second and third flash device groups.

Upon receipt of the command, the flash-device microcomputer 200 sends by optical communication the information on the ratios G2 and G3 to the second and third wireless flash devices or the second and third flash device groups through the light emitting part composed of the members 19, 20 and 21.

The microcomputer of each of the flash devices sets a value "INTp×r=INTm" according to a value which is the same as the ratio G1, G2 or G3 or a value r which corresponds thereto for the value INTp obtained at the time of flat preliminary light emission of the flash device. Then, in making an exposure at the step S112, the flash devices respectively control their light emission amounts according to the set values INTm.

At a step S212, the flow returns to the main routine shown in FIG. 6.

Figure 13:
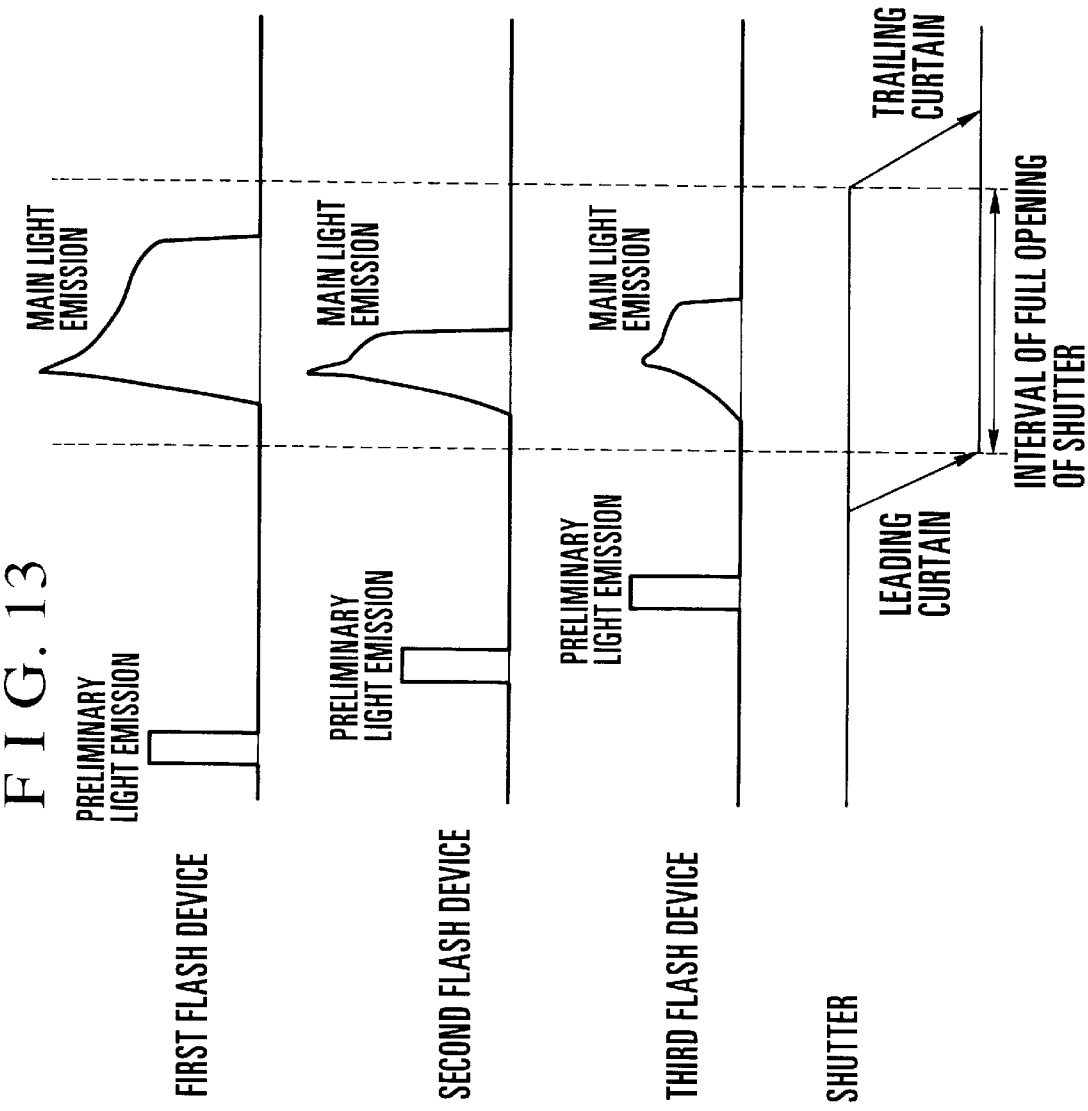
FIG. 13 is a timing chart showing the main routine of FIG. 6.

FIG. 13 is a timing chart showing in outline a series of actions of the first embodiment. The first, second and third flash devices perform their preliminary light emitting actions one after another. The main light emitting actions of them are respectively controlled according to their computed light emission amounts and are simultaneously performed when an exposure is made by fully opening the shutter.

As described above, even in carrying out flash photography with a plurality of flash devices, or flash device groups, the flash-device/camera system according to the first embodiment of the invention causes each of the flash devices or flash device groups to make preliminary light emission, measures the light reflected by the object and computes the main light emission amount for each of the flash devices on the basis of the object-reflected light measured. The camera system is thus arranged to have excellent operability and to permit the operator to take pictures finely conforming to the intentions of the operator.

(Second Embodiment)

Figure 16:
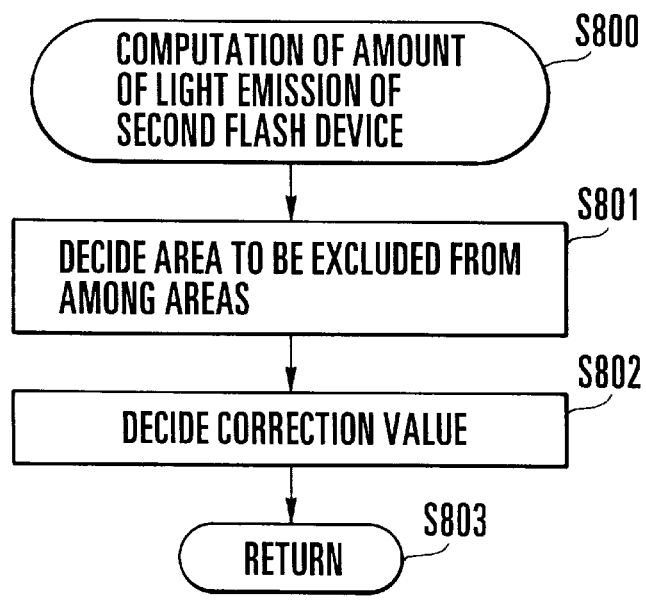
FIG. 16 is a flow chart showing a subroutine for the computation of the amount of light emission of a second flash device in the second embodiment of the invention.
Figure 17:
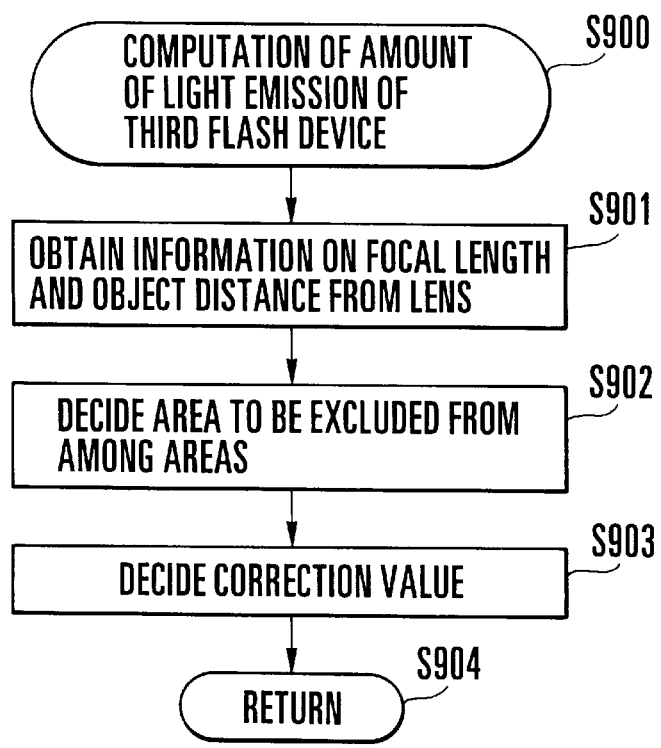
FIG. 17 is a flow chart showing a subroutine for the computation of the amount of light emission of a third flash device in the second embodiment of the invention.

FIGS. 15 to 17 are flow charts showing flows of operations of a flash-device/camera system according to a second embodiment of the invention. The fundamental arrangement of the second embodiment is similar to that of the first embodiment described in the foregoing and shown in FIG. 1 to 5. The following describes the second embodiment mainly through the actions of the camera microcomputer 100.

FIG. 15 shows a subroutine corresponding to the step S207 of FIG. 7 to be executed in the first embodiment.

At a step S700 of FIG. 15, a subroutine for the computation of the amount of light emission of the first flash device begins.

At a step S701, the camera microcomputer 100 obtains information on the focal length of the photo-taking lens and an object distance from the lens microcomputer 112 of the photo-taking lens connected to the camera body.

At a step S702, the camera microcomputer 100 decides any area to be excluded from among other areas of the image plane according to the object-reflected light ΔF of the preliminary light emission obtained for each of light measuring areas and the above-stated information obtained from the photo-taking lens. For example, any area that shows a large value of the reflected light ΔF although it represents a relatively far object distance is excluded as an inapposite area.

There is some regular reflection of glass or the like showing some object that excessively reflects the preliminary light emission within the image plane and is apt to be mistaken for a main object. The step S702 is provided for the purpose of preventing such an object from being mistaken for a main object.

At a step S703, a flash light correcting value (light emission stopping level) is decided on the same concept as the correcting amount "Cratio" of the step S304 of FIG. 8. This correction value is of course adjustable to some extent either by the operator by adding some value or according to the magnification of an object image. For example, in a case where an object is to be illuminated with the first and second flash devices and the background is to be illuminated with the third flash device by setting the light emission amounts of the first, second and third flash devices to be in the ratio of 7:2:1, the light emission stopping levels of the first, second and third flash devices are set as follows:

Light emission stop level of the first flash device:

$(7/10) \times A$

Light emission stop level of the second flash device:

$(2/10) \times A$

Light emission stop level of the third flash device:

$(1/10) \times A$ where "A" represents a light emission stopping level at an apposite exposure.

In accordance with these correction values, i.e., light emission stopping levels, the camera microcomputer 100, at the time of the exposure action at the step S112 of FIG. 6, causes the film-surface-reflected light measuring sensor 24 to measure a film-surface-reflected light and decides a flash light amount by stopping the light emission of the flash devices in real time. The correction values are thus used in deciding a flash light control level for the so-called film-surface flash TTL automatic light control. In this instance, the film-surface-reflected light measuring sensor 23 is arranged to have multi-divided areas in the same manner as the multi-divided light measuring sensor 7. The light emission from the first flash device is brought to a stop when the integral value of measured light value of each of these areas, excluding an area corresponding to the above-stated excluded area, reaches the light emission stopping level of the first flash device.

At a step S704, the subroutine for the computation of the amount of light emission of the first flash device is terminated.

FIG. 16 is a flow chart showing a subroutine corresponding to the step S208 of the first embodiment shown in FIG. 7.

At a step S800 of FIG. 16, the subroutine for the computation of the amount of light emission of the first flash device begins.

At a step S801, the same area that has been excluded for the first flash device is also excluded for the second flash device.

At a step S802, flash light correction values are decided on the same concept as the decision made for the correction amount "Cratio" at the step S304 of FIG. 8. In this case, the correction value becomes "$(2/10) \times A$". The correction value is of course adjustable to some extent either by the operator by adding some value or according to the magnification of an object image.

In accordance with these correction values, the camera microcomputer 100, at the time of the exposure action at the step S112 of FIG. 6, causes the film-surface-reflected light measuring sensor 24 to measure a film-surface-reflected light and decides a flash light amount by stopping the light emission of the flash devices in real time. The correction values are thus used in deciding a flash light control level for the so-called film-surface flash TTL automatic light control. Further, with the sensor 24 arranged to be a divided sensor, TTL light control is carried out using the outputs of areas other than the excluded area.

At a step S803, the subroutine for the computation of the amount of light emission of the second flash device is terminated.

FIG. 17 is a flow chart showing a subroutine corresponding to the step S209 of the first embodiment shown in FIG. 7.

The steps S900 to S904 of FIG. 17 are identical with the steps S700 to S704 of FIG. 15.

Unlike the first and second flash devices, the third flash device is used not for illuminating a main object but for illuminating the background of the main object. The third flash device is thus arranged to be independently controlled to appositely illuminate the background. In this case, for example, a method of excluding any area where the reflected light value $\Delta F$ is larger than a predetermined value is employed.

In the second embodiment, like in the case of preliminary light emission, the main light emitting actions of the first, second and third flash devices are arranged to be consecutively performed one after another at different time points while an exposure is in process with the shutter fully opened.

As described above, even in carrying out flash photography with a plurality of flash devices, the flash-device/camera system according to the second embodiment of the invention causes each of the flash devices to make preliminary light emission, measures the light reflected by the object, decides any area to be excluded, and computes the correction values on the measured values of film-surface-reflected light. The flash-device/camera system thus can be arranged to have excellent operability and to permit the operator to take pictures finely conforming to the intentions of the operator.

As described above, according to each of the embodiments of the invention, even in carrying out flash photography with a plurality of flash devices, each of the plurality of flash devices is made to make preliminary light emission, the amounts of light reflected by the object are measured, an area by which the amount of light emission of the main light emission during an exposure is to be decided is selected, so that the amount of light emission of the main light emission is decided or corrected. Accordingly, there is provided a camera system or a flash photography system which has excellent operability and permits the operator to take pictures finely conforming to the intentions of the operator.

I claim:

1. A camera system comprising:

a plurality of flash light emission means for performing flash light emission toward an object during an exposure;

preliminary light emission control means for causing said plurality of flash light emission means to sequentially make preliminary light emission toward the object prior to the flash light emission to be performed by said plurality of flash light emission means during the exposure;

compression-type light measuring means for compressing a photoelectric current obtained by converting light from the object and for outputting the compressed photoelectric current as a voltage; and light emission amount control means for controlling amounts of light emission of said plurality of flash light emission means during the exposure on the basis of light measurement outputs during the preliminary light emission obtained by said compression-type light measuring means by measuring reflected light from the object caused by said preliminary light emission control means.

2. A camera system according to claim 1, wherein said compression-type light measuring means includes means for outputting a luminance value of each of a plurality of areas into which an image plane is divided.

3. A camera system according to claim 1, wherein said light emission amount control means includes light amount ratio control means for controlling a light amount ratio among the amounts of light emission of said plurality of flash light emission means during the exposure in such a way as to be set to a predetermined value.

4. A camera system according to claim 3, wherein said light amount ratio control means includes means for, so as to attain the light amount ratio, correcting the amounts of light emission of said plurality of flash light emission means from respective normal amounts of light emission each of which individually gives an apposite amount of exposure.

5. A camera system according to claim 1, wherein said light amount control means includes means for controlling the amounts of light emission of said plurality of flash light emission means during the exposure in such a way as to be set to respective normal amounts of light emission each of which individually gives an apposite amount of exposure.

6. A camera system comprising:

a plurality of flash light emission means for performing flash light emission toward an object during an exposure;

preliminary light emission control means for causing said plurality of flash light emission means to sequentially make preliminary light emission toward the object prior to the flash light emission to be performed by said plurality of flash light emission means during the exposure;

light measuring means for outputting a luminance value of each of a plurality of areas into which an image plane is divided;

first light emission amount computing means for measuring, by said light measuring means, reflected light from the object caused by the preliminary light emission made by a first flash light emission means of said plurality of flash light emission means, and for computing, on the basis of the measured reflected light, an amount of light emission to be performed by said first flash light emission means during the exposure;

second light emission amount computing means for measuring, by said light measuring means, reflected light from the object caused by the preliminary light emission made by a second flash light emission means of said plurality of flash light emission means, and for computing, on the basis of the measured reflected light, an amount of light emission to be performed by said second flash light emission means during the exposure; and deciding means for deciding a rate of contribution of each of the plurality of areas of said light measuring means to the computation by said first light emission amount computing means and a rate of contribution of each of the plurality of areas of said light measuring means to the computation by said second light emission amount computing means, said deciding means relating the rate of contribution of each of the plurality of areas to the computation by said second light emission amount computing means with the rate of contribution of each of the plurality of areas to the computation by said first light emission amount computing means.

7. A camera system according to claim 6, wherein said deciding means includes means for bringing the rate of contribution of each of the plurality of areas to the computation by said second light emission amount computing means into a value equal to or close to the rate of contribution of each of the plurality of areas to the computation by said first light emission amount computing means.

8. A camera system according to claim 6, wherein said first and second light emission amount control means include means for controlling a light amount ratio of the amounts of light emission of said first flash light emission means and said second flash light emission means during the exposure in such a way as to be set to a predetermined value.

9. A camera system according to claim 8, wherein said first and second light emission amount computing means includes means for, so as to attain the light amount ratio, correcting the amounts of light emission of said first flash light emission means and said second flash light emission means from respective normal amounts of light emission each of which individually gives an apposite amount of exposure.

10. A camera system according to claim 6, wherein said first and second light emission amount computing means include means for controlling the amounts of light emission of said first flash light emission means and said second flash light emission means during the exposure in such a way as to be set to respective normal amounts of light emission each of which individually gives an apposite amount of exposure.

11. A camera system according to claim 6, wherein said deciding means includes means for deciding the rate of contribution of each of the plurality of areas to the computation by said first light emission amount computing means on the basis of information on a focusing state of each of the plurality of areas.

12. A camera system according to claim 6, wherein said deciding means includes means for deciding the rate of contribution of each of the plurality of areas to the computation by said first light emission amount computing means on the basis of a luminance value of each of the plurality of areas obtained from reflected light from the object caused by the preliminary light emission.

13. A camera system according to claim 6, wherein said deciding means includes means for deciding the rate of contribution of each of the plurality of areas to the computation by said first light emission amount computing means on the basis of an area where a luminance value thereof obtained from reflected light from the object caused by the preliminary light emission is the largest of luminance values of the plurality of areas.

14. A camera system according to claim 6, wherein said first and second light emission amount computing means includes means for performing a computing operation for obtaining a weighted mean on the basis of the rate of contribution of each of the plurality of areas of said light measuring means.

15. A camera system comprising:

first and second flash light emission means for performing flash light emission toward an object during an exposure;

first and second preliminary light emission control means for respectively causing said first and second flash light emission means to sequentially make preliminary light emission toward the object prior to the flash light emission to be performed by said first and second flash light emission means during the exposure;

light measuring means for outputting a luminance value of each of a plurality of areas into which an image plane is divided;

first light emission amount computing means for measuring, by said light measuring means, reflected light from the object caused by the preliminary light emission made by said first flash light emission means, and for computing, on the basis of the measured reflected light, an amount of light emission to be performed by said first flash light emission means during the exposure;

second light emission amount computing means for measuring, by said light measuring means, reflected light from the object caused by the preliminary light emission made by said second flash light emission means, and for computing, on the basis of the measured reflected light, an amount of light emission to be performed by said second flash light emission means during the exposure; and deciding means for deciding, among the plurality of areas of said light measuring means, an area which contributes the computation by said first light emission amount computing means and an area which contributes the computation by said second light emission amount computing means, said deciding means being capable of making the area which contributes the computation by said first light emission amount computing means different from the area which contributes the computation by said second light emission amount computing means.

16. A camera system according to claim 15, wherein said deciding means includes means for deciding only an area of part of the plurality of areas of said light measuring means as the area which contributes to the computation by said first light emission amount computing means and for deciding not only the area of part decided as the area which contributes to the computation by said first light emission amount computing means but also other areas as the area which contributes to the computation by said second light emission amount computing means.

17. A camera system according to claim 15, wherein said deciding means includes means for causing one of the computations by said first and second light emission amount computing means to be performed by using a light measurement value obtained in an area corresponding to a focus detecting area among the plurality of areas of said light measuring means and for causing the other of the computations by said first and second light emission amount computing means to be performed by using a light measurement value selected on a different basis from the one of the computations.

18. A camera system according to claim 17, wherein said deciding means includes means for causing the other of the computations by said first and second light emission amount computing means to be performed by using the largest of light measurement values obtained in the plurality of areas of said light measuring means.

19. A camera system according to claim 15, wherein said deciding means includes means for causing one of the computations by said first and second light emission amount computing means to be performed by using the largest of light measurement values of the plurality of areas of said light measuring means and for causing the other of the computations by said first and second light emission amount computing means to be performed by using a light measurement value selected on a different basis from the one of the computations.

20. A camera system according to claim 19, wherein said deciding means includes means for causing the other of the computations by said first and second light emission amount computing means to be performed by using a light measurement value obtained in an area corresponding to a focus detecting area among the plurality of areas of said light measuring means.

* * * * *

UNITED STATES PATENT AND TRADEMARK OFFICE
CERTIFICATE OF CORRECTION

PATENT NO. : 6,075,947
DATED : June 13, 2000
INVENTOR(S) : Tatsuyuki Tokunaga

Page 1 of 1

It is certified that error appears in the above-identified patent and that said Letters Patent is hereby corrected as shown below:

Column 9,
Line 33, delete "SELL" and insert -- SEL1 --.

Column 13,
Line 9, delete "usec" and insert -- μsec --.

Column 18,
Line 18, delete "log2" and insert -- $\log_2$ --.

Signed and Sealed this

Twenty-eighth Day of August, 2001

Attest:

*Nicholas P. Godici*

NICHOLAS P. GODICI
*Attesting Officer*   *Acting Director of the United States Patent and Trademark Office*